(12) United States Patent
Yamanaka et al.

(10) Patent No.: US 8,169,572 B2
(45) Date of Patent: May 1, 2012

(54) DISPLAY APPARATUS AND ELECTRONIC APPARATUS

(75) Inventors: Go Yamanaka, Kanagawa (JP);
 Masafumi Matsui, Kanagawa (JP);
 Mitsuru Tateuchi, Kanagawa (JP);
 Yasuhito Maki, Tokyo (JP); Yoshiharu Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 939 days.

(21) Appl. No.: 11/902,838

(22) Filed: Sep. 26, 2007

(65) Prior Publication Data

US 2008/0084526 A1 Apr. 10, 2008

(30) Foreign Application Priority Data

Oct. 4, 2006 (JP) ................. 2006-272786

(51) Int. Cl.
 *G02F 1/1343* (2006.01)
 *G02F 1/135* (2006.01)
 *G06F 3/042* (2006.01)
(52) U.S. Cl. ............... 349/116; 349/139; 345/175
(58) Field of Classification Search ............ 349/42, 349/111, 116, 139; 345/175, 207; 250/208.1, 250/214.1
 See application file for complete search history.

(56) References Cited

U.S. PATENT DOCUMENTS

2007/0070056 A1 * 3/2007 Sato et al. ............... 345/207

FOREIGN PATENT DOCUMENTS

| JP | 01-143257 A | 6/1989 |
|---|---|---|
| JP | 10-090655 A | 4/1998 |
| JP | 10-333605 A | 12/1998 |
| JP | 11-125841 A | 5/1999 |
| JP | 11-134105 | 5/1999 |
| JP | 2002-041244 | 2/2002 |
| JP | 2002-149085 | 5/2002 |
| JP | 2004-318067 | 11/2004 |
| JP | 2004-318819 | 11/2004 |
| JP | 2005-107383 A | 4/2005 |
| JP | 2006-003857 A | 1/2006 |
| JP | 2008-158478 A | 7/2008 |

\* cited by examiner

*Primary Examiner* — David Nelms
*Assistant Examiner* — Tai Duong
(74) *Attorney, Agent, or Firm* — Rader, Fishman & Grauer PLLC

(57) ABSTRACT

A display apparatus includes: at least one pixel section including a display cell that has a pixel electrode and a light-receiving cell that has a light-receiving element; and a shielding electric conductor configured to electrically shield the pixel electrode on the side of the display cell from the light-receiving element. The shielding electric conductor is formed between the pixel electrode and the light-receiving element and has a fixed potential.

4 Claims, 27 Drawing Sheets

DISPLAY IMAGE

CAPTURED IMAGE
(WITHOUT SHIELDING CONDUCTIVE FILM)

CAPTURED IMAGE
(WITH SHIELDING CONDUCTIVE FILM)

DISPLAY APPARATUS AND ELECTRONIC APPARATUS

CROSS REFERENCES TO RELATED APPLICATIONS

The present invention contains subject matter related to Japanese Patent Application JP 2006-272786 filed in the Japanese Patent Office on Oct. 4, 2006, the entire contents of which are incorporated herein by reference.

BACKGROUND OF THE INVENTION

1. Field of the Invention

The present invention relates to a display apparatus including display pixels each including a light-receiving element and an electronic apparatus incorporating such a display apparatus.

2. Description of the Related Art

There are some techniques for providing a coordinate input function for a display apparatus. More specifically, for example, display apparatuses having such a coordinate input function include a display apparatus with a pressure-sensitive touch panel (see, Japanese Unexamined Patent Application Publication Nos. 2002-149085 and 2002-41244) and a display apparatus with an electromagnetic induction touch panel (see, Japanese Unexamined Patent Application Publication No. 11-134105).

However, it is difficult to miniaturize the above-described display apparatuses having a coordinate input function. Furthermore, such display apparatuses are more expensive than normal display apparatuses. In order to overcome these difficulties, the development of display apparatuses capable of specifying coordinates by detecting light received by a light-receiving element included in each pixel thereof have been performed actively (see, Japanese Unexamined Patent Application Publication Nos. 2004-318067 and 2004-318819).

The above-described display apparatuses capable of receiving a coordinate input operation using light-receiving elements can be miniaturized and are more cost-effective than display apparatuses with the coordinate input function. Furthermore, the above-described display apparatuses can receive a multipoint coordinate input operation and an area input operation.

SUMMARY OF THE INVENTION

In such display apparatuses including light-receiving elements, however, a signal occurring on the display side may be mixed with a signal occurring on the light-receiving (image capturing) side via a parasitic capacitance. In order to prevent such a situation, a method of setting an image capturing frame period between successive display frame periods, and performing image capturing in the image capturing frame period can be performed. However, even if this method is performed, the mixing of a signal occurring on the display side with a signal occurring on the image capturing side cannot be prevented with certainty. Furthermore, synchronization between the display side and the image capturing side is required.

It is desirable to provide a display apparatus capable of preventing the mixing of a signal occurring on the display side with a signal occurring on the light-receiving side via a parasitic capacitance, and capable of asynchronously operating the display side and the light-receiving side.

A display apparatus according to an embodiment of the present invention includes: at least one pixel section including a display cell that has a pixel electrode and a light-receiving cell that has a light-receiving element; and a shielding electric conductor configured to electrically shield the pixel electrode on the side of the display cell from the light-receiving element. The shielding electric conductor is formed between the pixel electrode and the light-receiving element and has a fixed potential.

The display apparatus preferably further includes another shielding electric conductor configured to electrically shield the pixel electrode on the side of the display cell from a light-receiving signal line that is connected to the light-receiving cell and transmits a light-receiving signal generated from light received by the light-receiving element. The other shielding electric conductor is formed between the pixel electrode and the light-receiving signal line and has a fixed potential.

The shielding electric conductor and the other shielding electric conductor are preferably formed using an existing electroconductive film.

The shielding electric conductor is preferably formed at least one of positions above and below the light-receiving element in a direction perpendicular to a main surface of a substrate. The other shielding electric conductor is preferably formed at least one of positions above and below the light-receiving element and the light-receiving signal line in a direction perpendicular to a main surface of a substrate.

The shielding electric conductor and the other shielding electric conductor preferably electrically shield only a part of an electrode obtained by excluding a region of an active layer of the light-receiving element from a whole region of the light-receiving element.

The light-receiving element is preferably formed using a thin-film transistor formed on an insulating substrate. The shielding electric conductor and the other shielding electric conductor preferably electrically shield a region obtained by excluding a part of an electrode region of the thin-film transistor that is the light-receiving element from a whole electrode region of the thin-film transistor.

The light-receiving element is preferably formed using a diode formed on an insulating substrate. The shielding electric conductor and the other shielding electric conductor preferably electrically shield a region obtained by excluding a region of an active layer of the diode that is the light-receiving element from a whole region of the diode.

A display apparatus according to an embodiment of the present invention includes: a plurality of pixel sections arranged in a matrix form each including a display cell and a light-receiving cell, the display cell including a pixel electrode and a thin-film transistor configured to operatively connect the pixel electrode and a signal line in response to a scanning pulse applied to a gate electrode, the light-receiving cell including a light-receiving element and being connected to a light-receiving signal line through which a light-receiving signal generated from light received by the light-receiving element is transmitted; and a shielding electric conductor configured to electrically shield the pixel electrode on the side of the display cell from the light-receiving element and/or the light-receiving signal line, the shielding electric conductor being formed at least one of between the pixel electrode and the light-receiving element and between the pixel electrode and the light-receiving signal line and having a fixed potential.

An electronic apparatus includes one of the above-described display apparatuses according to an embodiment of the present invention.

According to an embodiment of the present invention, in a display apparatus including light-receiving elements, by electrically shielding each of the light-receiving elements from a pixel electrode on the display side using an electro-conductive film, the mixing of a signal occurring on the display side with a signal occurring on the light-receiving side via a parasitic capacitance can be prevented.

According to an embodiment of the present invention, the mixing of a signal occurring on the display side with a signal occurring on the light-receiving side via a parasitic capacitance can be prevented. Furthermore, the display side and the light-receiving side can be asynchronously operated.

DESCRIPTION OF THE PREFERRED EMBODIMENTS

Embodiments of the present invention will be described below with reference to the accompanying drawings.

In the following, in order to make embodiments of the present invention more easily understandable, first, the basic configuration and function of a liquid crystal display apparatus including display pixels each including a light-receiving element will be described. Subsequently, the concrete configuration thereof will be described.

Figure 1:
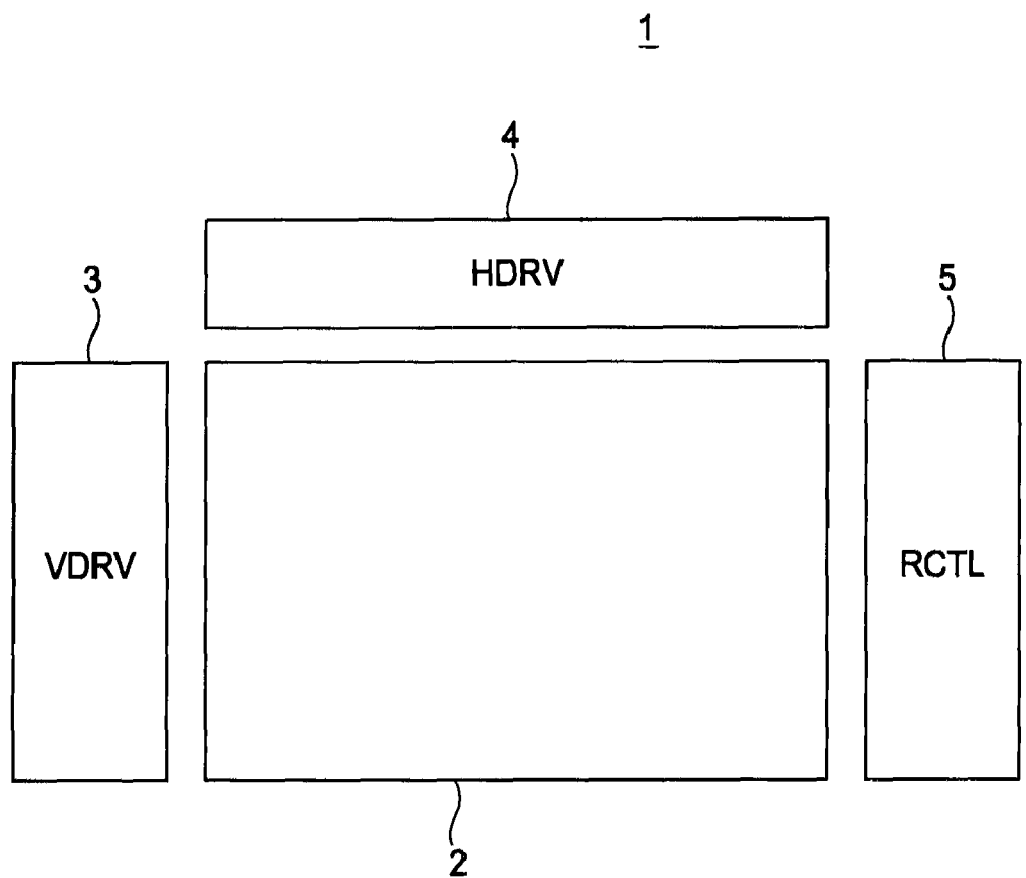
FIG. 1 is a block diagram illustrating an exemplary configuration of a liquid crystal display apparatus according to an embodiment of the present invention.
Figure 2:
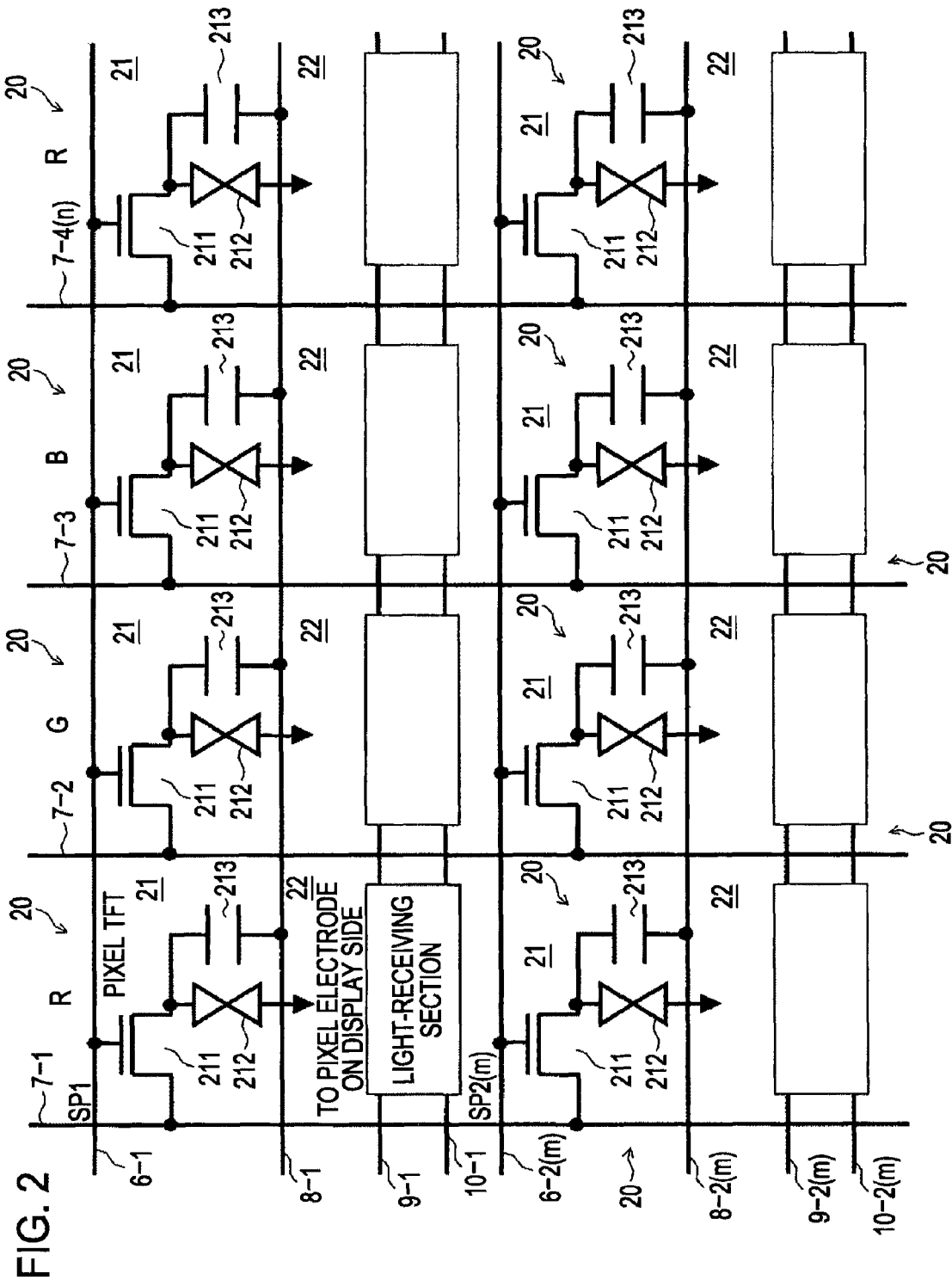
FIG. 2 is a diagram illustrating an exemplary configuration of an effective pixel region in the liquid crystal display apparatus illustrated in FIG. 1.

FIG. 1 is a block diagram illustrating an exemplary configuration of a liquid crystal display apparatus according to an embodiment of the present invention. FIG. 2 is a diagram illustrating an exemplary configuration of an effective pixel region in the liquid crystal display apparatus illustrated in FIG. 1.

As illustrated in FIG. 1, a liquid crystal display apparatus 1 is provided with an effective pixel region 2, a vertical drive circuit (VDRV) 3, a horizontal drive circuit (HDRV) 4, and a light-receiving control circuit (RCTL) 5.

In the effective pixel region 2, a plurality of pixel sections 20 are arranged in a matrix form. Each of the pixel sections 20 includes a display cell 21 and a light-receiving cell 22 which are arranged parallel to each other.

As illustrated in FIG. 2, each of the display cells 21 includes a thin-film transistor (TFT) 211 as a switching element, a liquid crystal cell (LC) 212 having a pixel electrode connected to the drain (or source) electrode of the TFT 211, and a storage capacitor (Cs) 213 having electrodes one of which is connected to the drain electrode of the TFT 211. For the display cells 21 that are included in the corresponding pixel sections 20, scanning lines (gate lines) 6-1 to 6-m are arranged in rows along the direction in which the pixel sections 20 are arranged, and signal lines 7-1 to 7-n are arranged in columns along the direction in which the pixel sections 20 are arranged. The gate electrodes of the TFTs 211 of the display cells 21 arranged in the same row are connected to the same scanning line, that is, one of the scanning lines (gate lines) 6-1 to 6-*m*. The source (or drain) electrodes of the TFTs 211 of the display cells 21 arranged in the same column are connected to the same signal line, that is, one of the signal lines 7-1 to 7-*n*. In general liquid crystal display apparatuses, pixel storage capacitor lines 8-1 to 8-*m* are independently arranged. Each of the storage capacitors 213 is formed between one of the pixel storage capacitor lines 8-1 to 8-*m* and a corresponding connection electrode. A predetermined DC voltage is applied to the counter electrode of the liquid crystal cell 212 of the display cell 21 included in each of the pixel sections 20 and/or the other one of electrodes of the storage capacitor 213 via a common line as a common voltage VCOM. Alternatively, the common voltage VCOM, the polarity of which is reversed in each horizontal scan period (1H), is supplied to the counter electrode of the liquid crystal cell 212 of the display cell 21 included in each of the pixel sections 20 and the other one of electrodes of the storage capacitor 213.

The scanning lines 6-1 to 6-*m* are driven by the vertical drive circuit 3. The signal lines 7-1 to 7-*n* are driven by the horizontal drive circuit 4.

Upon receiving a vertical start signal VST, a vertical clock signal VCK, and an enable signal ENB, the vertical drive circuit 3 performs scanning in the vertical direction (row direction) in each field period, thereby sequentially selecting the pixel sections 20 connected to the scanning lines 6-1 to 6-*m* on a row-by-row basis. That is, when a scanning pulse SP1 is transmitted from the vertical drive circuit 3 to the scanning line 6-1, pixel sections existing in the first row are selected. When a scanning pulse SP2 is transmitted from the vertical drive circuit 3 to the scanning line 6-2, pixel sections existing in the second row are selected. Similarly, scanning pulses SP3, . . . , and SPm are sequentially transmitted to the scanning lines 6-3, . . . , and 6-*m*.

Upon receiving from a clock generator (not shown) a horizontal start pulse HST instructing the start of horizontal scanning and horizontal clock signals HCK that have opposite phases and serve as reference signals for the horizontal scanning, the horizontal drive circuit 4 generates sampling pulses, sequentially performs sampling upon pieces of input image data R (red), G (green), and B (blue) in accordance with the generated sampling pulses, and supplies the sampling results to corresponding ones of the signal lines 7-1 to 7-*n* as a data signal to be written in a corresponding one of the pixel sections 20.

For the light-receiving cells 22 that are included in corresponding pixel sections 20, light-receiving element control lines 9-1 to 9-*m* and light-receiving signal lines 10-1 to 10-*m* are arranged in rows along the direction in which the pixel sections 20 are arranged.

Figure 3:
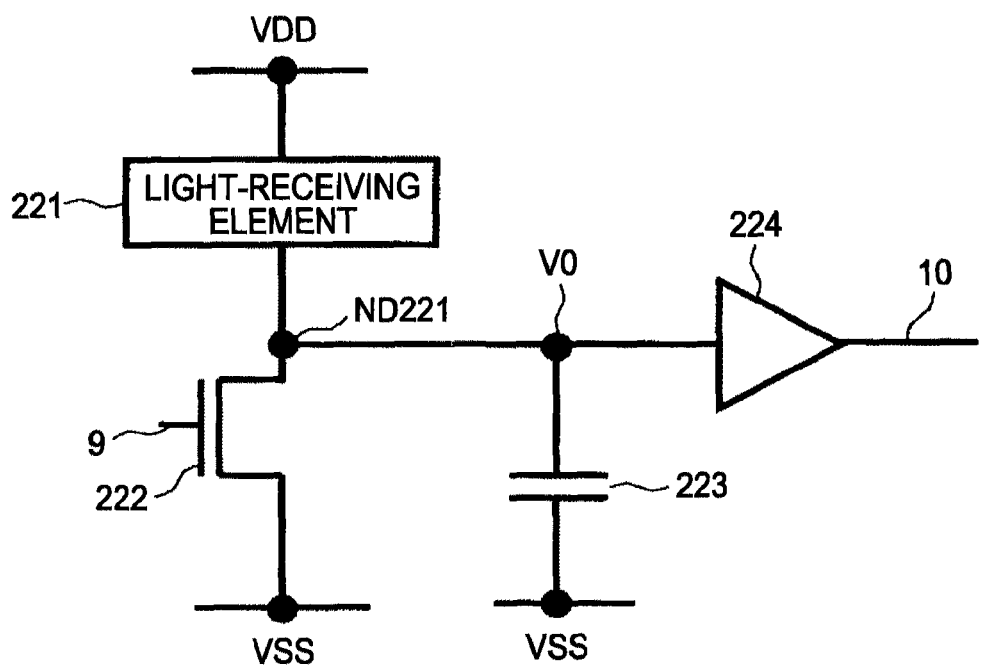
FIG. 3 is a circuit diagram illustrating a basic configuration of a light-receiving cell according to an embodiment of the present invention.

FIG. 3 is a circuit diagram illustrating an exemplary basic configuration of a light-receiving cell according to this embodiment.

The light-receiving cell 22 according to this embodiment is provided with a light-receiving element 221, a reset TFT 222, the light-receiving signal storage capacitor (C0) 223, an amplifier 224, and a node ND221. The light-receiving element 221 is formed using a TFT or a diode.

The light-receiving element 221 is connected between a power supply potential VDD and the node ND221. The reset TFT 222 is formed using, for example, an n-channel transistor. The source electrode of the reset TFT 222 is connected to a reference potential VSS (for example, the grand GND), the drain electrode of the reset TFT 222 is connected to the node ND221, and the gate electrode of the reset TFT 222 is connected to the light-receiving element control line 9 arranged in a corresponding row. The light-receiving signal storage capacitor 223 is connected between the node ND221 and the reference potential VSS. The input terminal of the amplifier 224 is connected to the node ND221 (to which the light-receiving signal storage capacitor 223 is connected), and the output terminal of the amplifier 224 is connected to the light-receiving signal line 10.

The light-receiving element control line 9 and the light-receiving signal line 10 are connected to the light-receiving control circuit 5. The light-receiving control circuit 5 applies a reset pulse to the light-receiving element control lines 9-1 to 9-*m* at a predetermined time. Consequently, the reset TFT 222 included each of the light-receiving cells 22 is turned on for a certain period, whereby the node ND221 is reset. That is, for example, the electrical charge stored in the light-receiving signal storage capacitor 223 connected to the node ND221 is discharged, the potential of the node ND221 is set to a reference potential, and then the state of the light-receiving cell 22 is reset to its initial state. At that time, if the light-receiving element 221 receives a predetermined amount of light, the light-receiving element 221 is brought into conduction. Subsequently, the potential of the node ND221 increases, and an electrical charge is stored in the light-receiving signal storage capacitor 223. The stored electrical charge is amplified by the amplifier 224 as an electric signal. The electric signal is output to the light-receiving signal line 10 as a light-receiving signal, and is then input into the light-receiving control circuit 5. The light-receiving control circuit 5 performs control of a predetermined function unit in response to the received light-receiving signal.

In the liquid crystal display apparatus 1 according to this embodiment, the pixel sections 20 are configured to prevent the mixing of a signal occurring in a display cell with a signal occurring in a light-receiving cell via a parasitic capacitance and to asynchronously operate the display cell and the light-receiving cell. In the following, the concrete configuration of each pixel section of the liquid crystal display apparatus 1 according to this embodiment will be described.

First Embodiment

Figure 4:
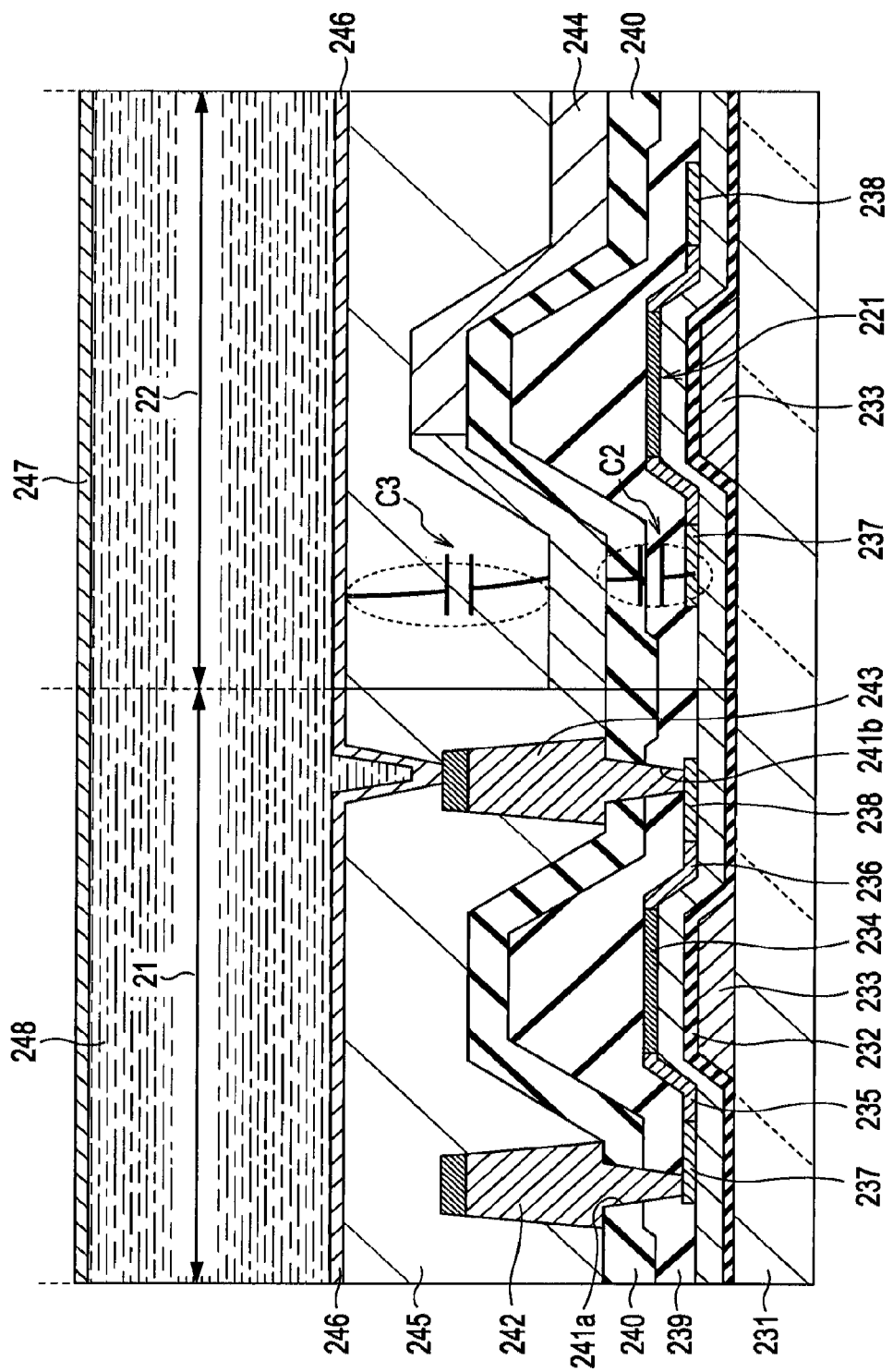
FIG. 4 is a cross-sectional view of a pixel section according to a first embodiment of the present invention.

FIG. 4 is a cross-sectional view of a pixel section according to the first embodiment of the present invention.

As illustrated in FIG. 4, in each of the pixel sections 20, the display cell 21 and the light-receiving cell 22 are arranged parallel to each other. A gate electrode 233 covered with a gate insulating film 232 is formed on a transparent insulating substrate 231 (for example, a glass substrate). The gate electrode 233 is connected to the scanning line (gate line) 6. The TFT 211 is turned on or off in accordance with a scanning signal input from the scanning line 6. The gate electrode 233 is formed by performing sputtering using a metal such as molybdenum (Mo) or tantalum (Ta) or an alloy. On the gate insulating film 232, a semiconductor film (channel forming region) 234, a pair of n−diffusion layers (LDD regions) 235 and 236 between which the semiconductor film 234 is sandwiched, and a pair of a n+diffusion layer (source region) 237 and a n+diffusion layer (drain region) 238 between which the semiconductor film 234 is sandwiched are formed. An interlayer insulating film 239 overlies the gate insulating film 232, the semiconductor film (channel forming region) 234, the n−diffusion layers (LDD regions) 235 and 236, the n+diffusion layer (source region) 237, and the n+diffusion layer (drain region) 238. An interlayer insulating film 240 made of, for example, SiN or SiO2 overlies the interlayer insulating film 239. In the pixel section 20 illustrated in FIG. 4, both of the display cell 21 and the light-receiving cell 22 have the above-described configuration.

In the display cell 21, the n+diffusion layer 237 is connected to a source electrode 242 via a contact hole 241a formed in the interlayer insulating films 239 and 240, and the n+diffusion layer 238 is connected to a drain electrode 243 via a contact hole 241b formed in the interlayer insulating films 239 and 240. The source electrode 242 and the drain electrode 243 are obtained by performing patterning using aluminum (Al). The source electrode 242 is connected to the signal line 7. The drain electrode 243 is connected to the transparent electrode (pixel electrode) on the display side via the connection electrode. In the light-receiving cell 22, a shielding conductive film 244 connected to a fixed potential is formed on the interlayer insulating film 240. The shielding conductive film 244 can be made of, for example, Al, TiAl, Mo, polycrystalline silicon, or a transparent electrode (ITO). In the case of the configuration illustrated in FIG. 4, it is desirable that the shielding conductive film 244 be made of a transparent electrode.

In the display cell 21 and the light-receiving cell 22, a planarizing film 245 is formed on the interlayer insulating film 240, the source electrode 242, the drain electrode 243, and the shielding conductive film 244. A transparent electrode (ITO) on the display side 246 is formed on the planarizing film 245. A liquid crystal layer 248 is formed by sealing a liquid crystal material between a pixel electrode (transparent electrode: ITO) on the counter electrode side 247 and the transparent electrode on the display side 246.

In this embodiment, in a display apparatus including light-receiving elements, the mixing of a signal occurring on the display side with a signal occurring on the light-receiving (image capturing) side is prevented by electrically shielding the light-receiving element 221 from the pixel electrode on the display side 246 using the shielding conductive film 244. In the following, the advantages of a pixel section including a shielding conductive film will be described with reference to FIGS. 4 to 12 while comparing such a pixel section with a pixel section that has no shielding conductive film.

Figure 5:
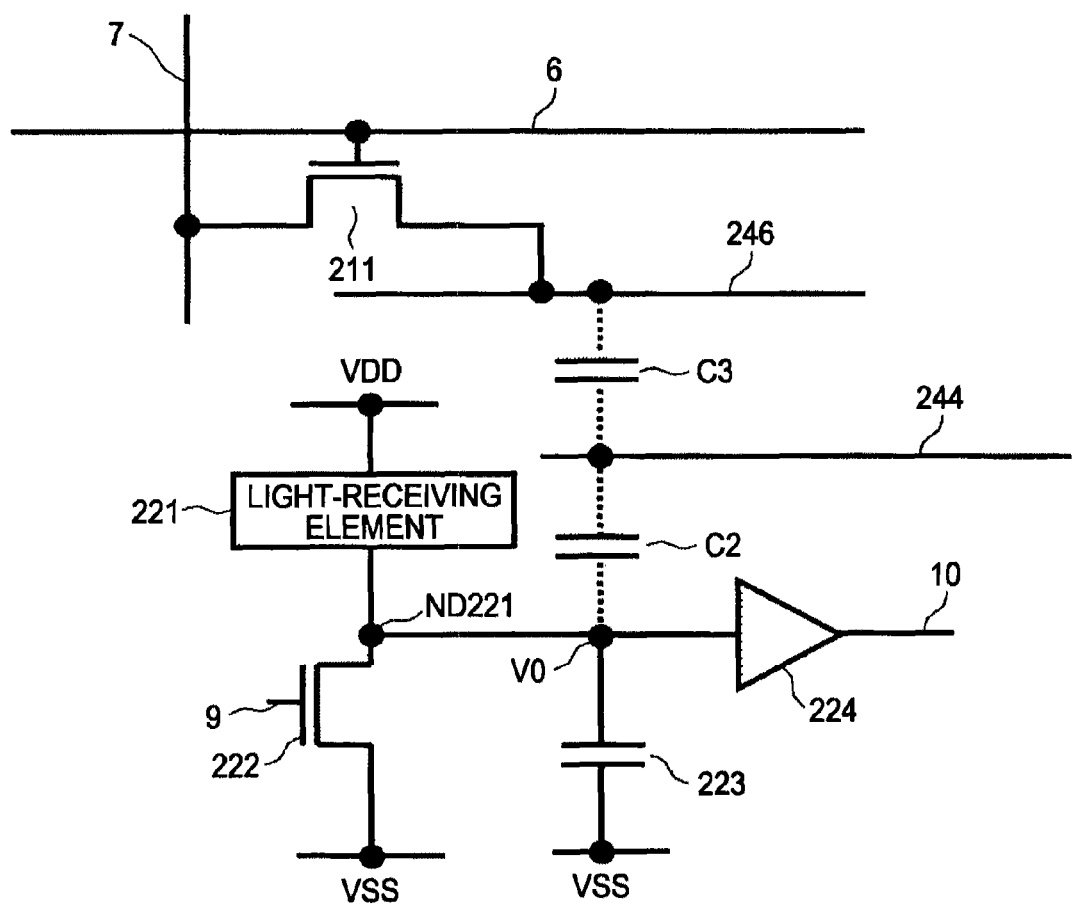
FIG. 5 is a conceptual diagram of an equivalent circuit of a light-receiving cell included in a pixel section according to the first embodiment.
Figure 6:
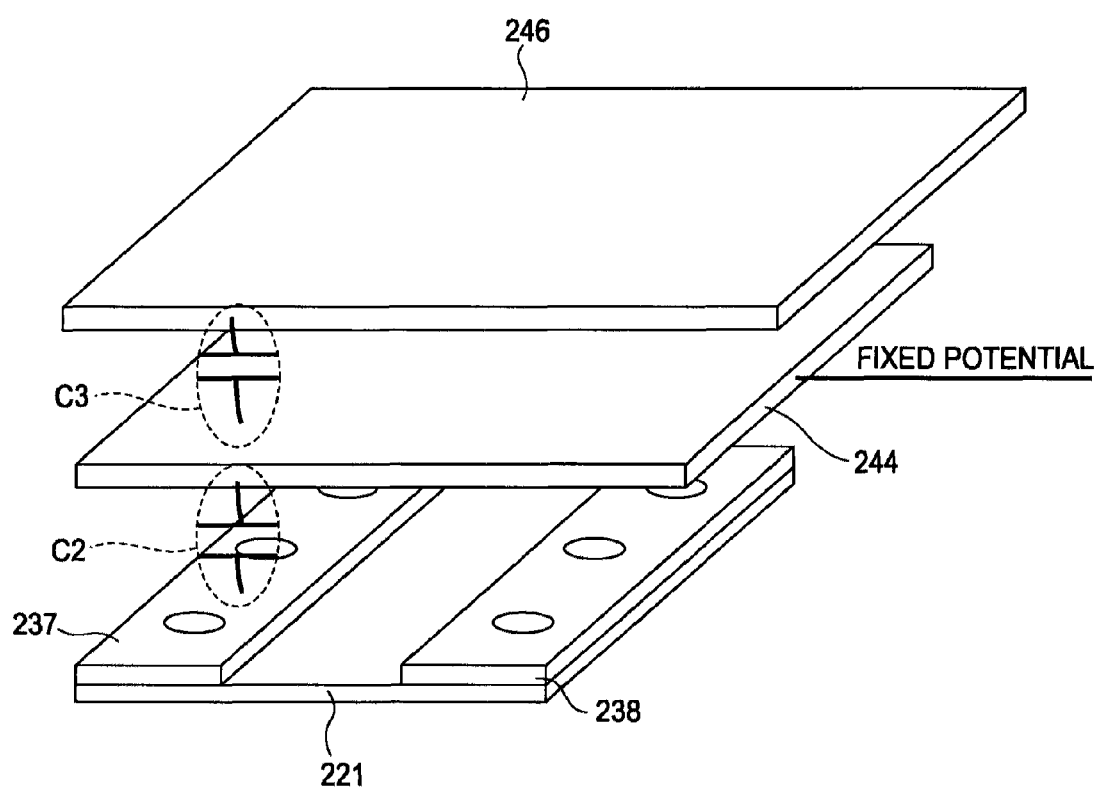
FIG. 6 is a conceptual perspective view of a light-receiving cell included in a pixel section according to the first embodiment.
Figure 7:
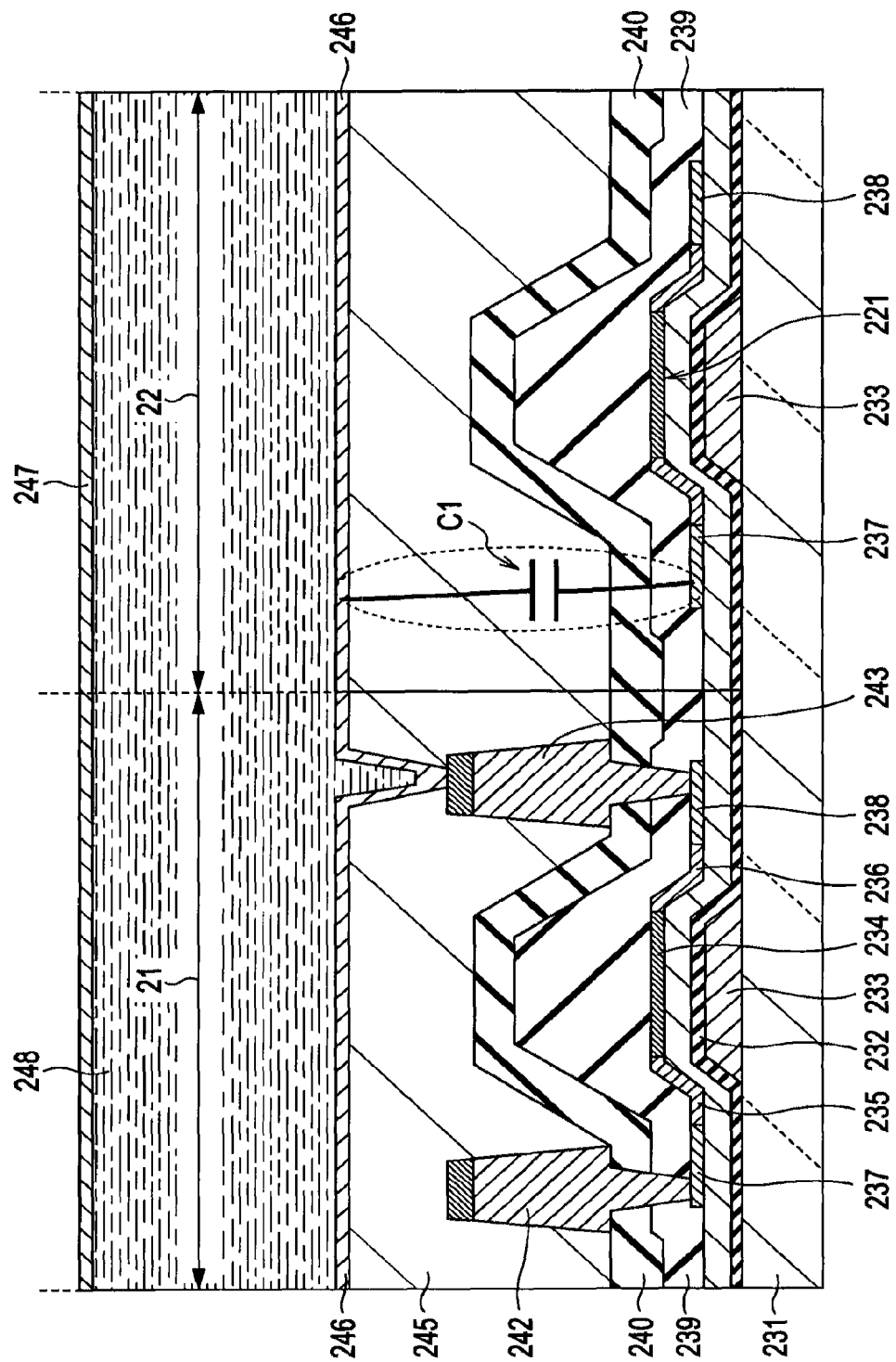
FIG. 7 is a cross-sectional view of a pixel section that has no shielding conductive film.
Figure 8:
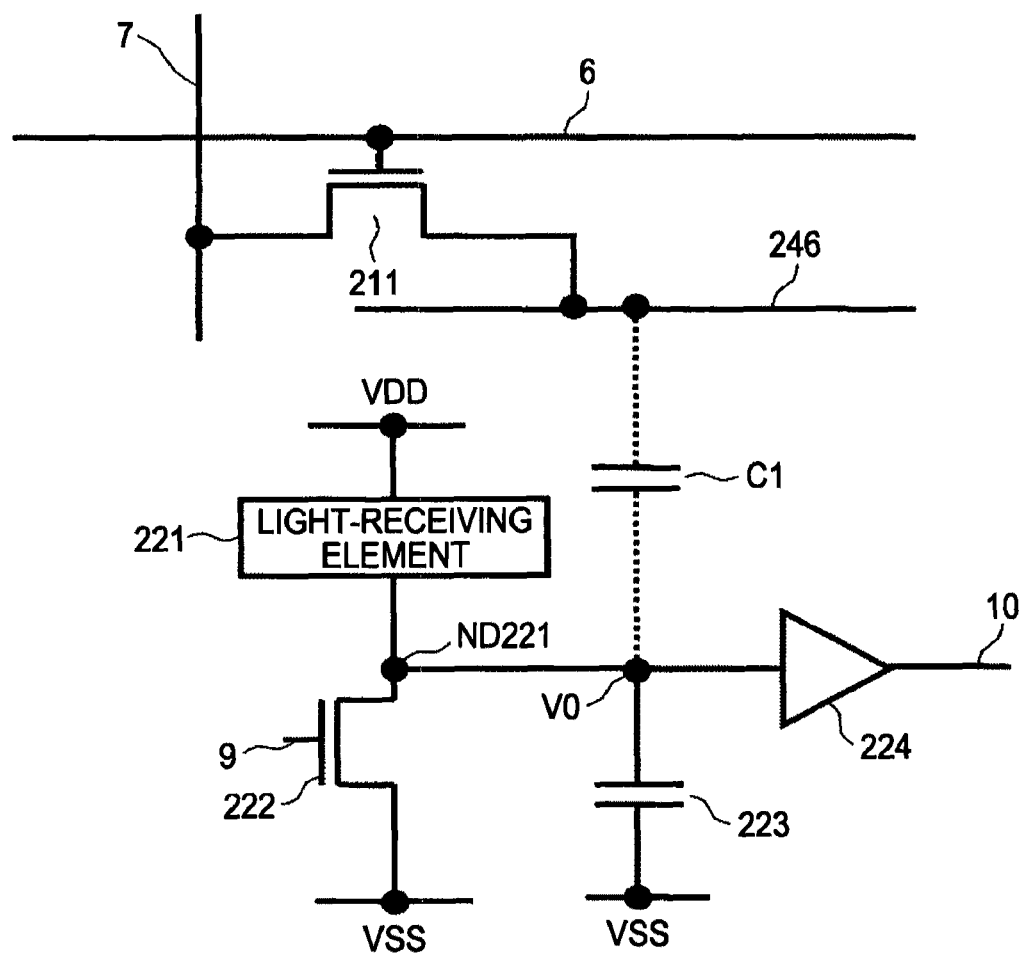
FIG. 8 is a conceptual diagram of an equivalent circuit of the light-receiving cell included in the pixel section illustrated in FIG. 7.
Figure 9:
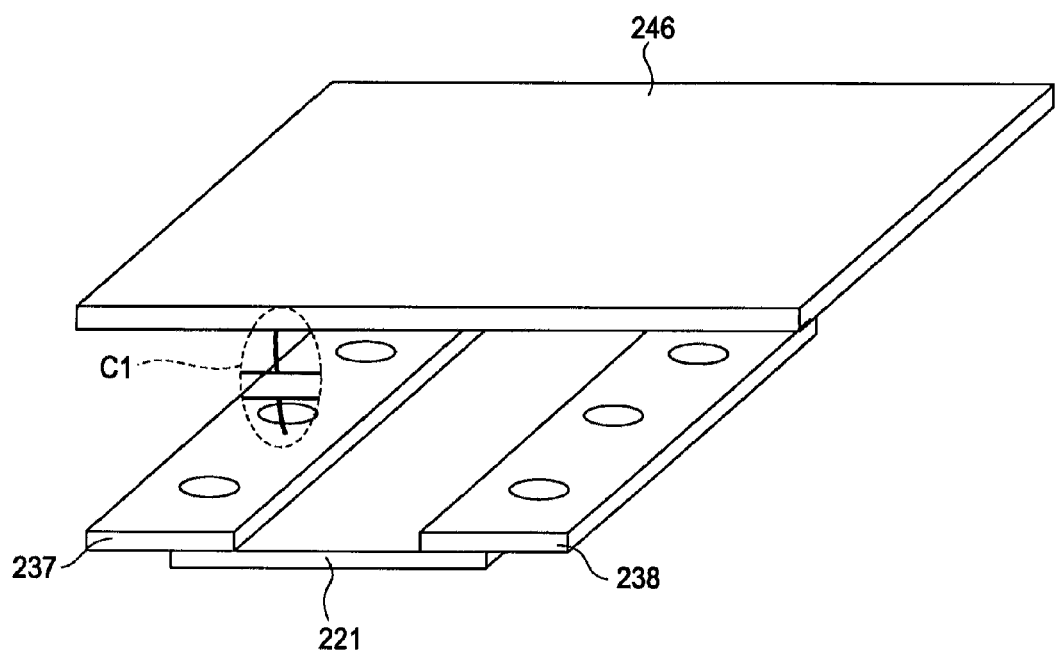
FIG. 9 is a conceptual perspective view of the light-receiving cell included in the pixel section illustrated in FIG. 7.
Figure 10:
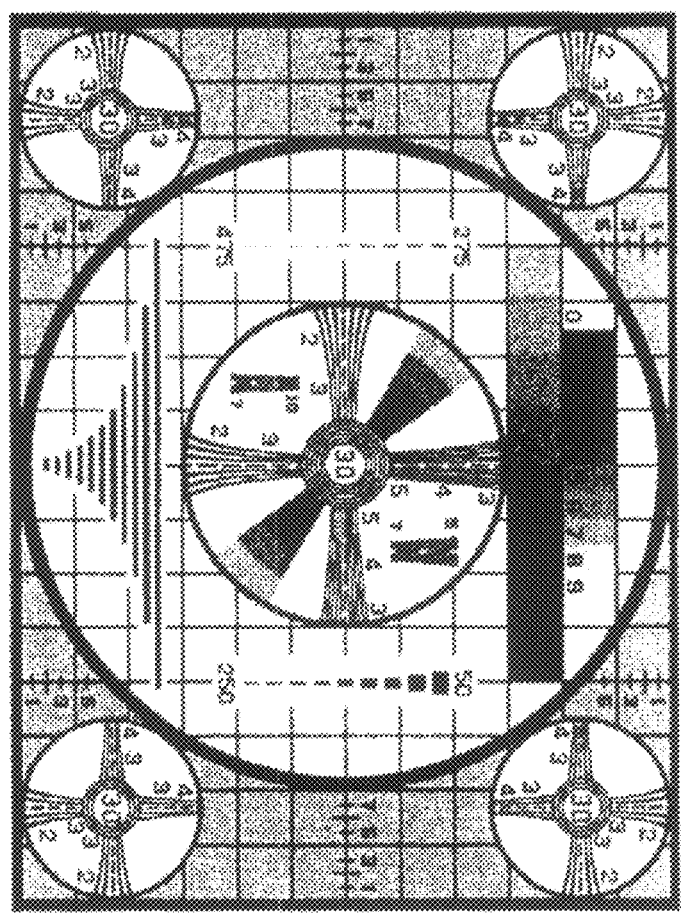
FIG. 10 is a diagram illustrating an example of a display image.
Figure 11:
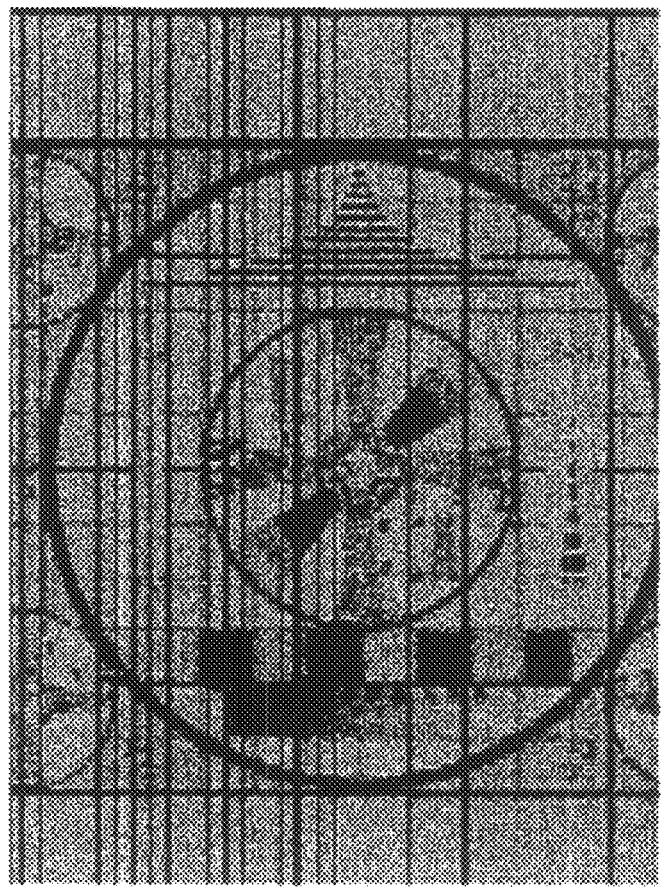
FIG. 11 is a diagram illustrating a captured image obtained when a shielding conductive film is not included in a pixel section.
Figure 12:
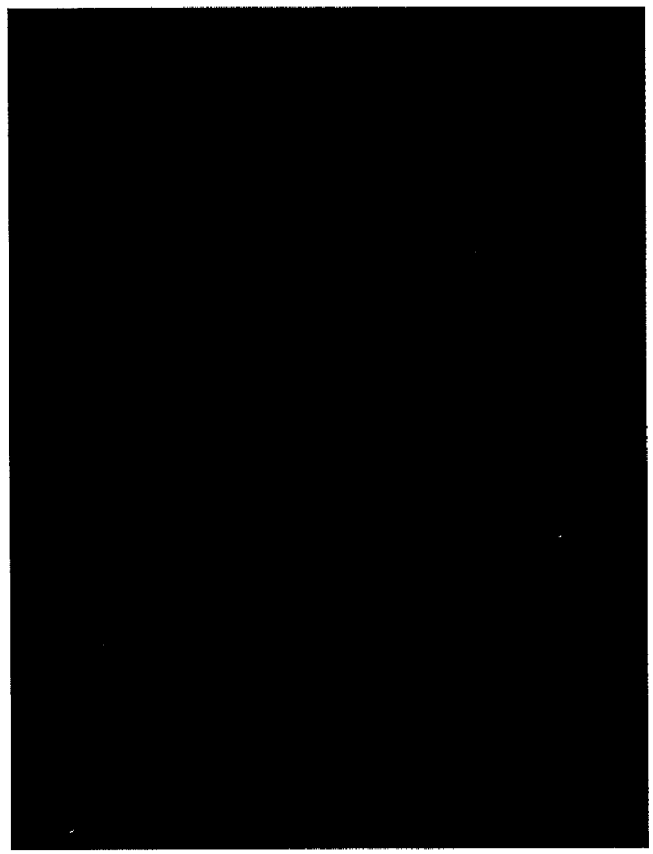
FIG. 12 is a diagram illustrating a captured image obtained when a shielding conductive film is included in a pixel section.

FIG. 5 is a conceptual diagram of an equivalent circuit of a light-receiving cell included in a pixel section according to this embodiment. FIG. 6 is a conceptual perspective view of a light-receiving cell included in a pixel section according to this embodiment. FIG. 7 is a cross-sectional view of a pixel section that has no shielding conductive film. FIG. 8 is a conceptual diagram of an equivalent circuit of the light-receiving cell included in the pixel section illustrated in FIG. 7. FIG. 9 is a conceptual perspective view of the light-receiving cell included in the pixel section illustrated in FIG. 7. FIG. 10 is a diagram illustrating an example of a display image. FIG. 11 is a diagram illustrating a captured image obtained when a shielding conductive film is not included in a pixel section. FIG. 12 is a diagram illustrating a captured image obtained when a shielding conductive film is included in a pixel section.

FIG. 11 illustrates an example of a captured image obtained when a display apparatus including light-receiving elements displays an image illustrated in FIG. 10 and then acquires light-receiving signals (image capturing signals) from the light-receiving elements without a shielding conductive film. As is apparent from FIG. 11, if the light-receiving element 221 is not shielded from the pixel electrode on the display side 246, a signal occurring on the display side is mixed with the captured image.

As illustrated in FIGS. 8 and 9, the reason why a signal occurring on the display side is mixed with a signal occurring on the light-receiving (image capturing) side is that the voltage value V0 of the light-receiving signal storage capacitor (C0) 223 for storing a light-receiving signal is affected by the voltage change of the pixel electrode on the display side 246 via a parasitic capacitance C1. Accordingly, in this embodiment, the mixing of a signal occurring on the display side with a signal occurring on the light-receiving (image capturing) side can be prevented by electrically shielding a light-receiving element from the pixel electrode on the display side 246 using a conductive film.

FIG. 12 illustrates an example of a captured image obtained when a display apparatus including light-receiving elements displays the image illustrated in FIG. 10, electrically shields the light-receiving element 221 from the pixel electrode on the display side 246 using the shielding conductive film 244, and then acquires a light-receiving (image capturing) signals from the light-receiving elements. As is apparent from FIG. 12, by electrically shielding the light-receiving element 221 from the pixel electrode on the display side 246, the mixing of a signal occurring on the display side with a captured image can be effectively prevented.

As illustrated in FIGS. 4 to 6, by disposing the shielding conductive film 244 between the light-receiving element 221 and the pixel electrode on the display side 246 and setting the potential of the shielding conductive film 244 to a fixed potential, even if the voltage of the pixel electrode is changed, the shielding conductive film can compensate the effects of the voltage change and the mixing of a signal occurring on the display side with a captured image can therefore be prevented.

As described previously, according to the first embodiment of the present invention, the mixing of a signal occurring on the display side with a signal occurring on the image capturing side via a parasitic capacitance can be prevented by disposing the shielding conductive film 244 between the light-receiving element 221 and the pixel electrode on the display side 246 in a display apparatus including light-receiving elements and setting the potential of the shielding conductive film 244 to a fixed potential. The mixing of a signal occurring on the display side with a signal occurring on the light-receiving (image capturing) side can be prevented by using only the above-described configuration. As a result, the display side and the light-receiving (image capturing) side can be asynchronously operated.

Second Embodiment

Figure 13:
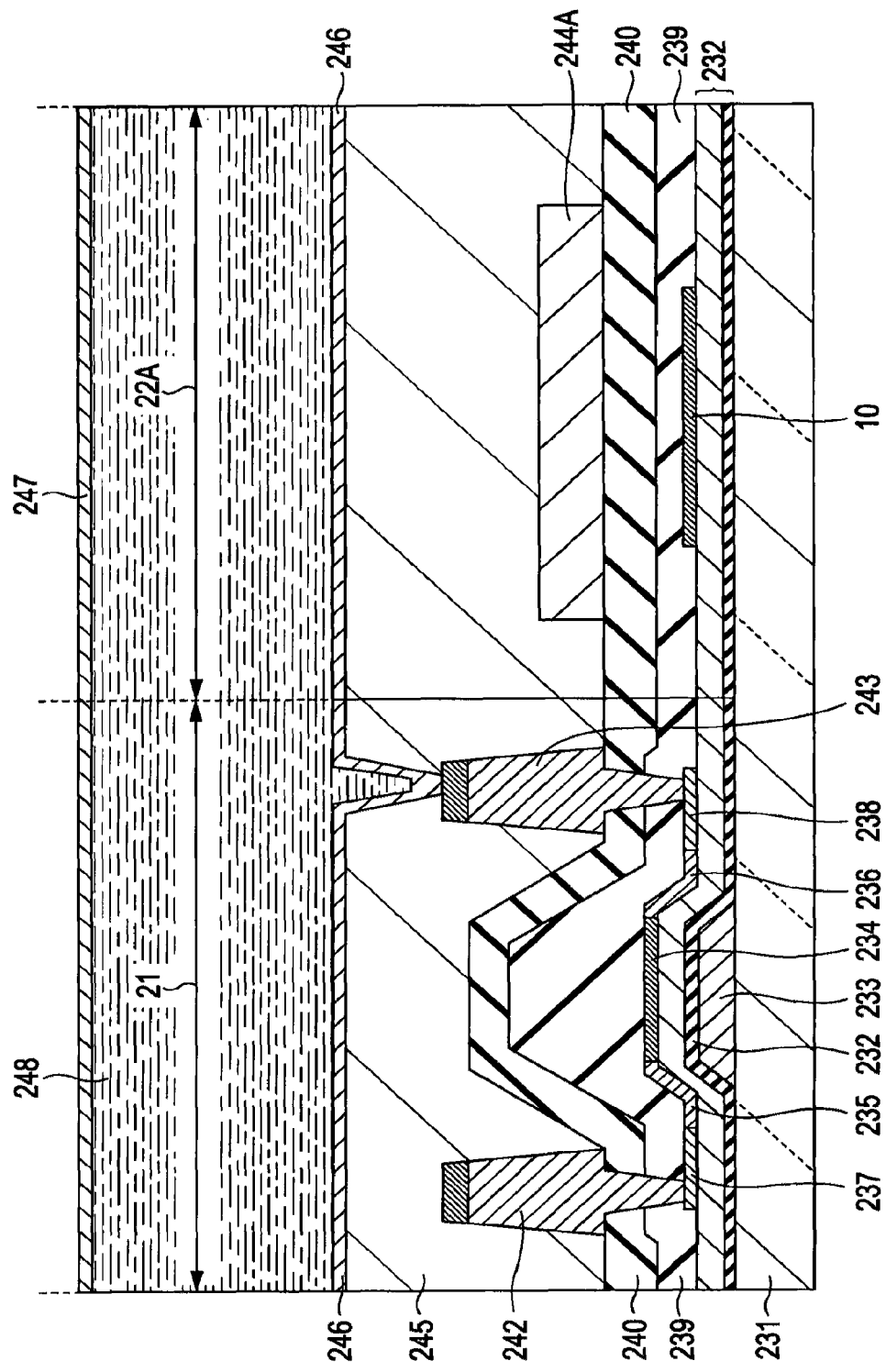
FIG. 13 is a cross-sectional view of a pixel section according to a second embodiment of the present invention.
Figure 14:
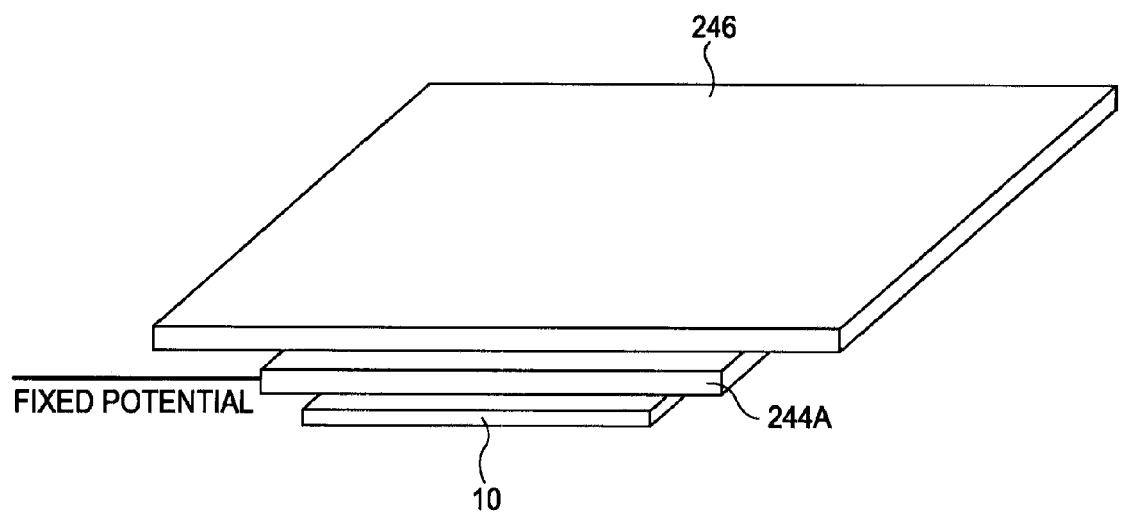
FIG. 14 is a conceptual perspective view of a region of a light-receiving signal line of a light-receiving cell included in a pixel section according to the second embodiment.

FIG. 13 is a cross-sectional view of a pixel section according to the second embodiment of the present invention. FIG. 14 is a conceptual perspective view of a region of a light-receiving signal line of a light-receiving cell included in a pixel section according to the second embodiment.

In a pixel section 20A according to the second embodiment, not only a light-receiving element but also a light-receiving signal line are shielded from a pixel electrode using a shielding conductive film. This is different from the pixel section 20 according to the first embodiment.

As illustrated in FIG. 13, the light-receiving signal line 10 is formed on the gate insulating film 232. The interlayer insulating film 239 overlies the light-receiving signal line 10. In a region on the interlayer insulating film 240 which corresponds to the light-receiving signal line 10 (a region capable of being shielded), a shielding conductive film 244A is selectively formed.

According to the second embodiment, not only a light-receiving element but also the light-receiving signal line 10 are shielded from the pixel electrode on the display side 246 using the shielding conductive film 244A. Accordingly, the mixing of a signal occurring on the display side with an image capturing signal can be more effectively prevented as compared with the case described in the first embodiment.

In this embodiment, a new shielding conductive film may be disposed or the existing shielding conductive film may be used. However, from the viewpoint of cost reduction, it is desirable that the existing shielding conductive film be used. As described previously, the shielding conductive film is an Al film, a TiAl film, an Mo film, a polycrystalline silicon film, or a transparent electrode (ITO) film. In this embodiment, however, the shielding conductive film is not limited to the above-described films. Furthermore, in this embodiment, the shielding conductive film is disposed above, below, or beside the light-receiving element 221 and the light-receiving signal line 10. Here, the shielding conductive film disposed above or below the light-receiving element 221 and the light-receiving signal line 10 means that the shielding conductive film, the light-receiving element 221, and the light-receiving signal line 10 are arranged in a direction perpendicular to the main surface of the transparent insulating substrate 231 on the drawing. As described previously, by placing the shielding conductive film 244 above the light-receiving element 221 so as to shield the light-receiving element 221 and the light-receiving signal line 10 from the pixel electrode on the display side 246, the effect of the change in voltage of the pixel electrode on the display side 246 on the light-receiving (image capturing) side can be prevented.

Third Embodiment

Figure 15:
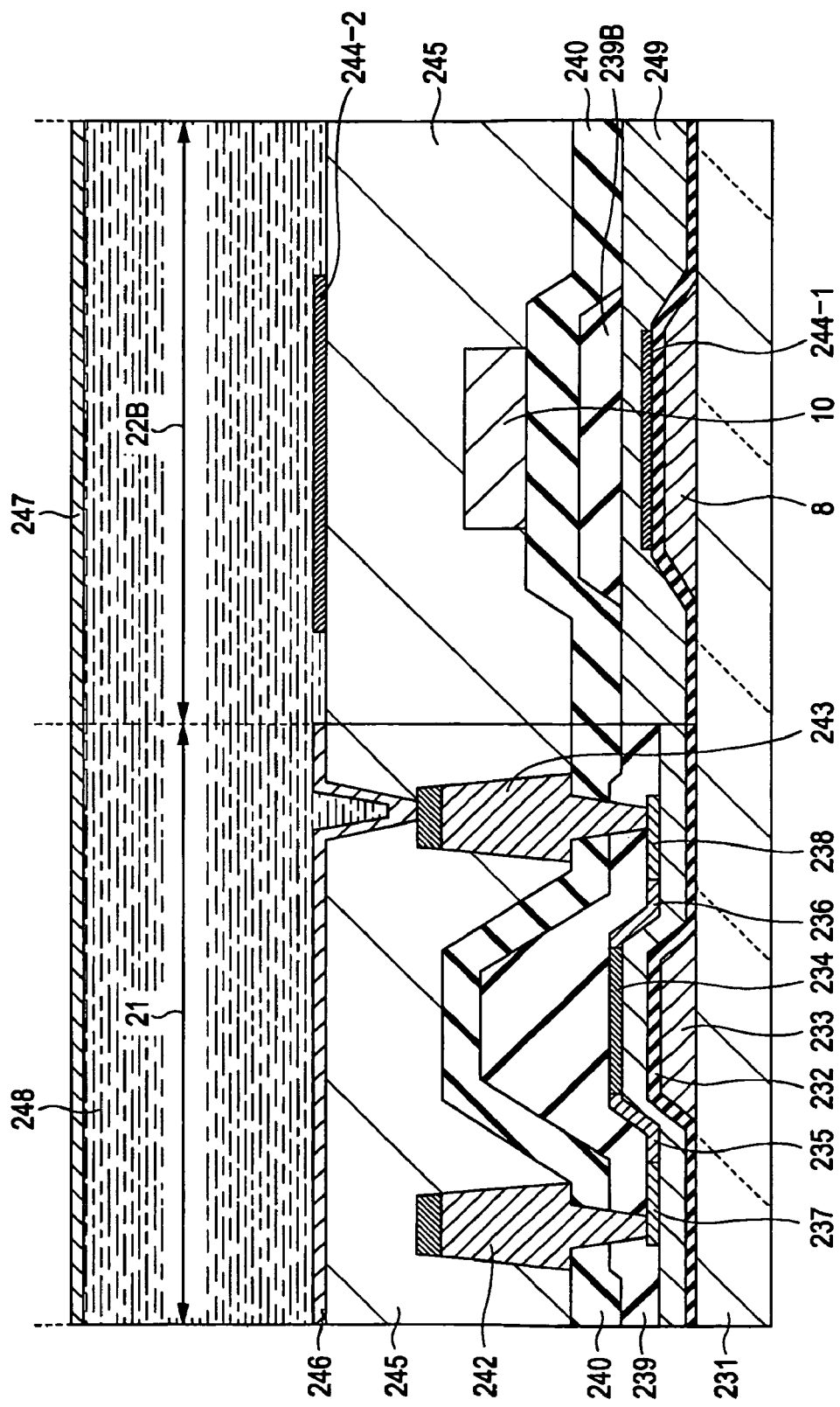
FIG. 15 is a cross-sectional view of a pixel section according to a third embodiment of the present invention.
Figure 16:
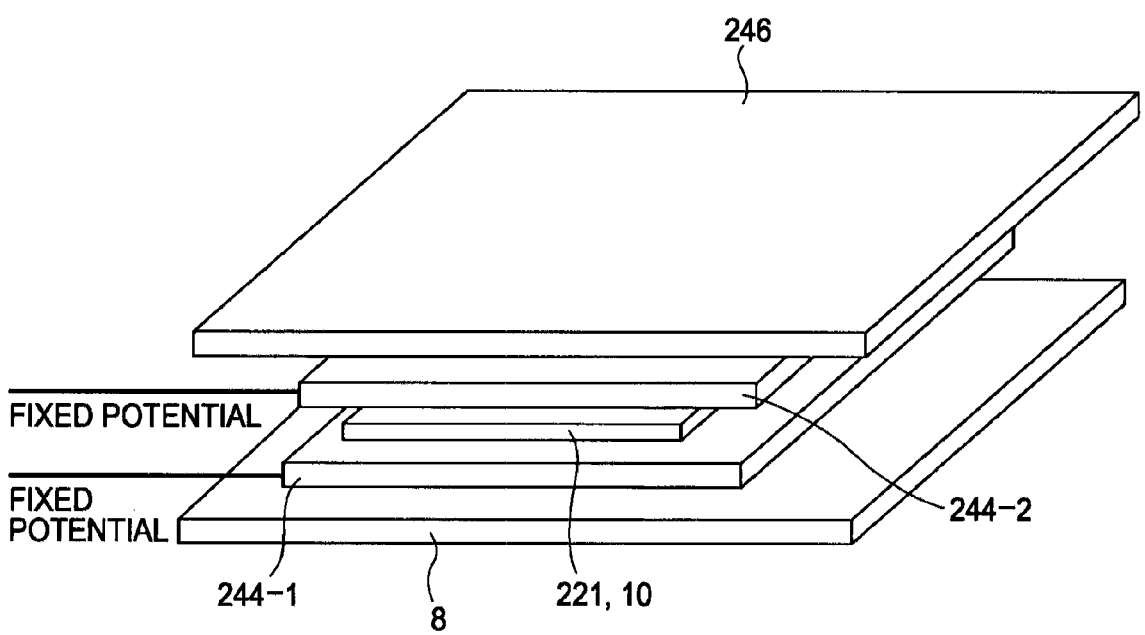
FIG. 16 is a conceptual perspective view of a region of a light-receiving element or light-receiving signal line of a light-receiving cell included in a pixel section according to the third embodiment.

FIG. 15 is a cross-sectional view of a pixel section according to the third embodiment of the present invention. FIG. 16 is a conceptual perspective view of a region of a light-receiving element or light-receiving signal line of a light-receiving cell included in a pixel section according to the third embodiment.

In a pixel section 20B according to the third embodiment, a shielding conductive film is placed both above and below a light-receiving element and/or a light-receiving signal line in a light-receiving cell. This is different from the pixel section 20 according to the first embodiment and the pixel section 20A according to the second embodiment.

The voltage of the pixel storage capacitor line 8 placed below the light-receiving element 221 and the light-receiving signal line 10 sometimes changes in accordance with a drive method of a display apparatus. Accordingly, in order to compensate the effect of such a voltage change, it is required to form a shielding conductive film below the light-receiving element and the light-receiving signal line. Furthermore, if the shielding conductive film is disposed both above and below the light-receiving element and the light-receiving signal line, the mixing of a signal occurring on the display side with a signal occurring on the image capturing side can be more effectively prevented.

FIG. 15 illustrates an exemplary configuration of the pixel section 20B in which a shielding conductive film is disposed both above and below the light-receiving signal line 10. In FIG. 15, the same reference numerals are used for components having the same functions as those of FIG. 4.

In a light-receiving cell 22B, the pixel storage capacitor line 8 covered with the gate insulating film 232 is formed on the transparent insulating substrate 231 (for example, a glass substrate). The pixel storage capacitor line 8 is formed using the same method used to form the gate electrode 233 included in the display cell 21. Like the gate electrode 233, the pixel storage capacitor line 8 is formed by performing sputtering using a metal such as molybdenum (Mo) or tantalum (Ta) or an alloy. In a region on the gate insulating film 232 which corresponds to the pixel storage capacitor line 8 (a region capable of being shielded), a first shielding conductive film 244-1 is formed. An insulating film 249 overlies the gate insulating film 232 and the shielding conductive film 244-1. In a region on the insulating film 249 which corresponds to a region where the pixel storage capacitor line 8 is formed, an insulating film 239B is formed. The interlayer insulating film 240 overlies the insulating film 239B and the insulating film 249. In a region on the interlayer insulating film 240 which corresponds to a region where the shielding conductive film 244-1 is formed, the light-receiving signal line 10 is formed. The light-receiving signal line 10 is formed using the same method and materials used to form the source electrode 242 and the drain electrode 243 in the display cell 21. The planarizing film 245 overlies the light-receiving signal line 10 and the interlayer insulating film 240.

As described previously in the first embodiment, the transparent electrode on the display side 246 is formed on the planarizing film 245. At that time, in the light-receiving cell 22B, the transparent electrode on the display side 246 is selectively formed in a region corresponding to the light-receiving signal line 10 (region capable of being shielded) as a second shielding conductive film 244-2. A liquid crystal material is sealed between the shielding conductive film 244-2 and the pixel electrode on the counter electrode side 247 (transparent electrode: ITO), whereby the liquid crystal layer 248 is formed.

According to the third embodiment, the mixing of a signal occurring on the display side with a signal occurring on the light-receiving (image capturing) side can be more effectively prevented by disposing a shielding conductive film both above and below a light-receiving element and/or a light-receiving signal line.

Fourth Embodiment

Figure 17:
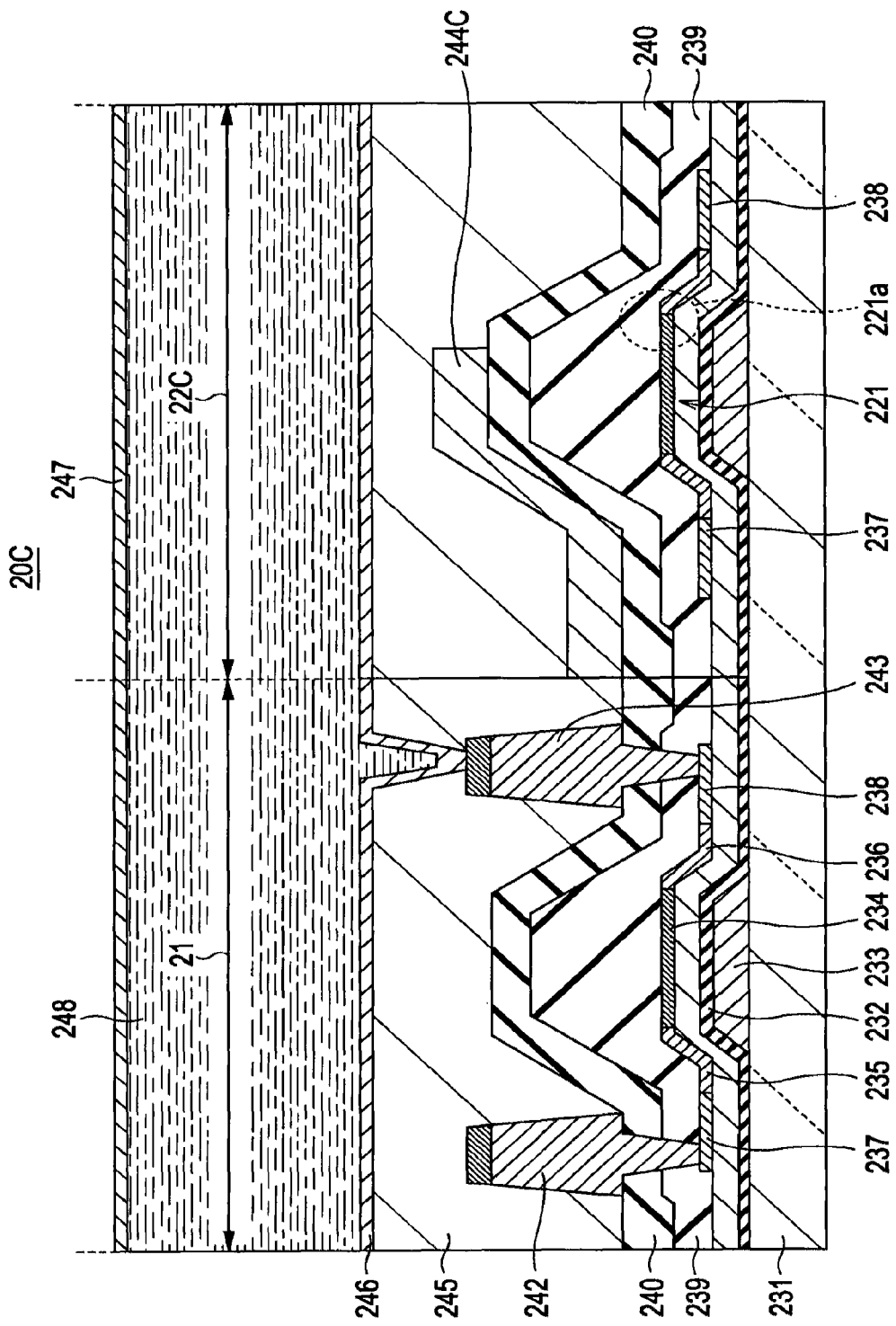
FIG. 17 is a cross-sectional view of a pixel section according to a fourth embodiment of the present invention.
Figure 18:
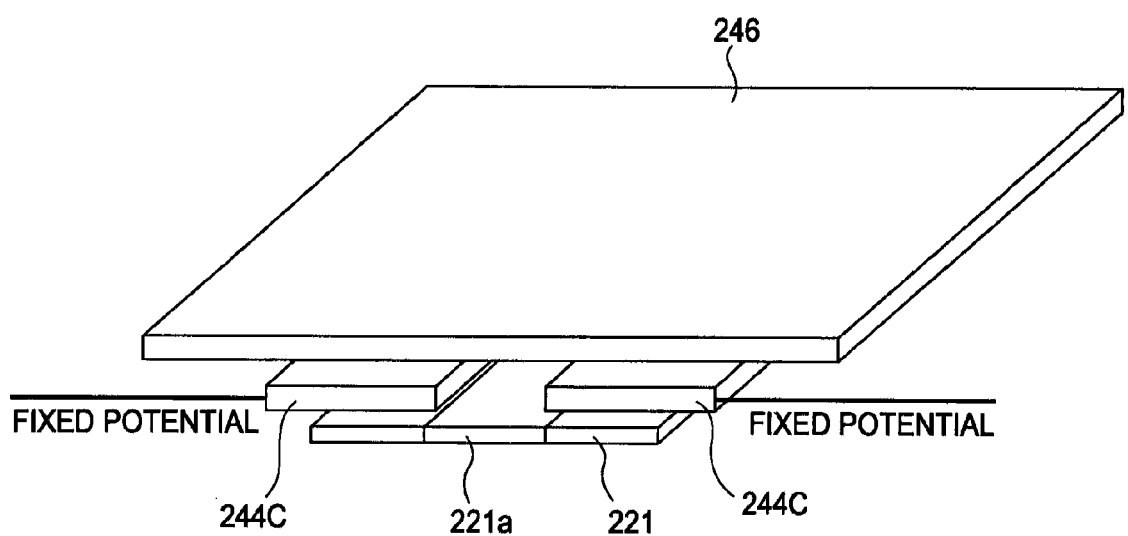
FIG. 18 is a conceptual perspective view of a region of a light-receiving element or light-receiving signal line of a light-receiving cell included in a pixel section according to the fourth embodiment.

FIG. 17 is a cross-sectional view of a pixel section according to the fourth embodiment of the present invention. FIG. 18 is a conceptual perspective view of a region of a light-receiving element or light-receiving signal line of a light-receiving cell included in a pixel section according to the fourth embodiment.

In a pixel section 20C according to the fourth embodiment, a shielding conductive film 244C is formed above the light-receiving element 221 in a light-receiving cell. At that time, in order to enable the light-receiving element 221 to receive light, the shielding conductive film 244C is not formed in the whole region above the light-receiving element 221, instead is formed in a part of an electrode obtained by excluding a region above an active layer 221a of the light-receiving element 221 from the whole region above the light-receiving element 221. This is different from a pixel section according to the first embodiment.

When a shielding conductive film is formed above a light-receiving element, it is desirable that the shielding region should not be the whole region above the light-receiving element, instead be only a part of an electrode which is obtained by excluding a region above an active layer of the light-receiving element from the whole region above the light-receiving element. Accordingly, in this embodiment, the configuration illustrated in FIGS. 17 and 18 is employed.

In this case, if the area of the shielding region is increased, the light-receiving element can be more effectively electrically shielded from the pixel electrode. On the other hand, however, the amount of light received by the light-receiving element is decreased, and a parasitic capacitance occurring between the light-receiving element and the shielding conductive film is increased. Accordingly, it is desirable that the optimization of the shielding region be performed. In this embodiment, the method of the optimization of the shielding region is not limited to a specific method.

Fifth Embodiment

Figure 19:
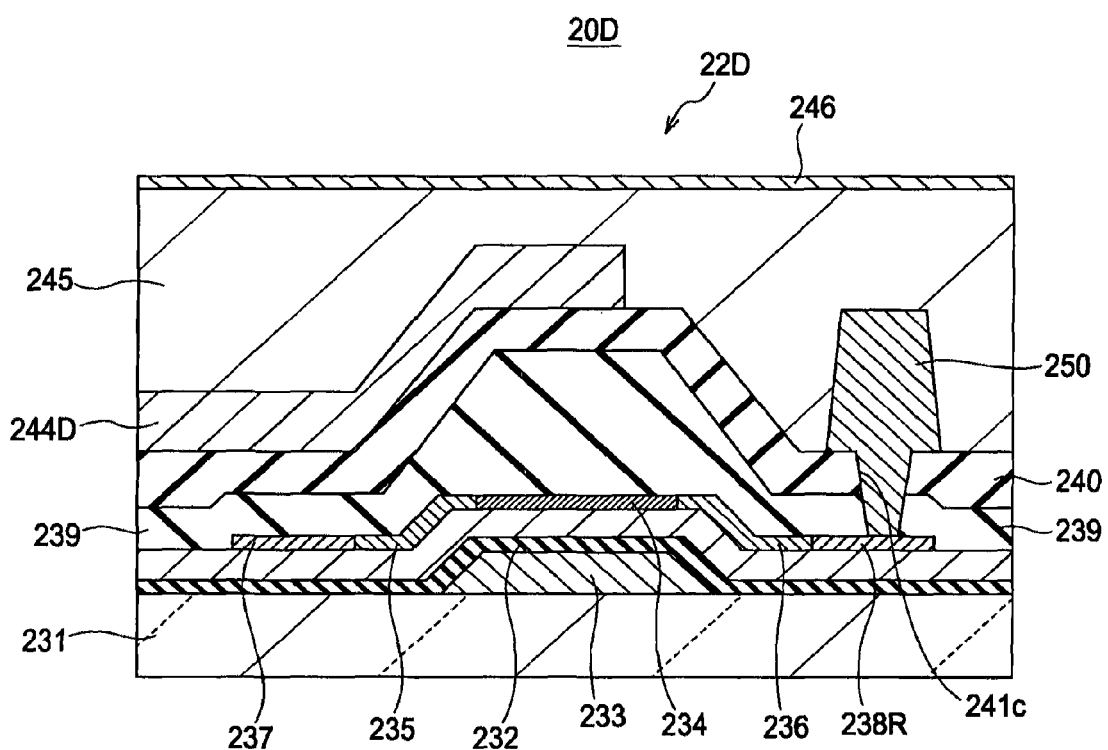
FIG. 19 is a cross-sectional view of a pixel section according to a fifth embodiment of the present invention.
Figure 20:
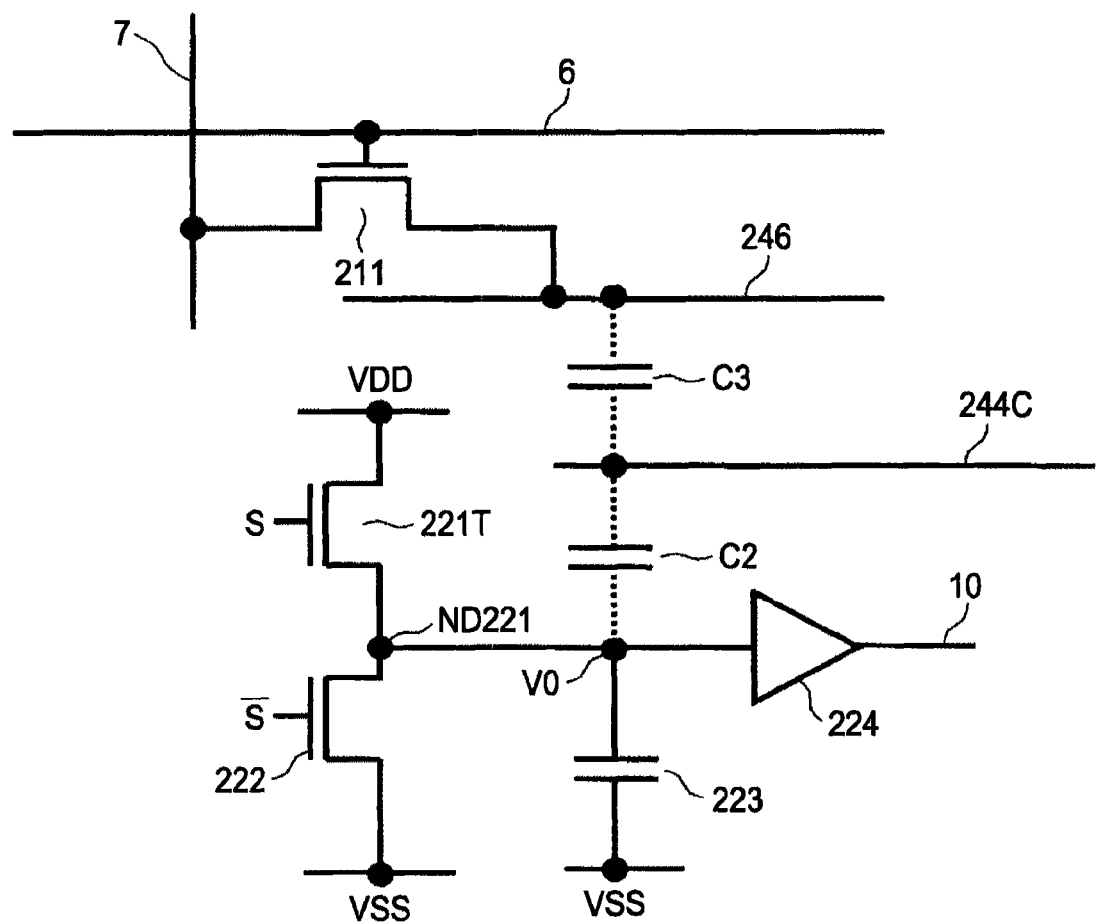
FIG. 20 is a conceptual diagram of an equivalent circuit of a light-receiving cell included in a pixel section according to the fifth embodiment.

FIG. 19 is a cross-sectional view of a pixel section according to the fifth embodiment of the present invention. FIG. 20 is a conceptual diagram of an equivalent circuit of a light-receiving cell included in a pixel section according to the fifth embodiment.

In a pixel section 20D according to the fifth embodiment, a TFT (thin-film transistor) 221T formed on a transparent insulating substrate is used as a light-receiving element. This is different from the pixel section 20C according to the fourth embodiment.

The configuration of the pixel section 20D is almost the same as that of the pixel section according to the fourth embodiment in FIG. 17. However, the difference between them is that a contact hole 241c reaching a drain electrode 238R of the TFT 221T is formed and the drain electrode 238R is connected to an electrode 250.

Thus, when a TFT (thin-film transistor) is used as a light-receiving element, it is required to apply the amount of potential smaller than a threshold potential to the gate of the TFT 221T so as to operate the TFT 221T without turning the TFT 221T on. Furthermore, when a TFT (thin-film transistor) is used as a light-receiving element, an active layer in which photoelectric conversion mainly occurs exists near the drain. Accordingly, like the fourth embodiment, as illustrated in FIG. 19, it is desirable that the shielding region formed by a shielding conductive film 244D should not include a region near the drain.

According to the fifth embodiment, an effect similar to that obtained from the first embodiment can be obtained.

Sixth Embodiment

Figure 21:
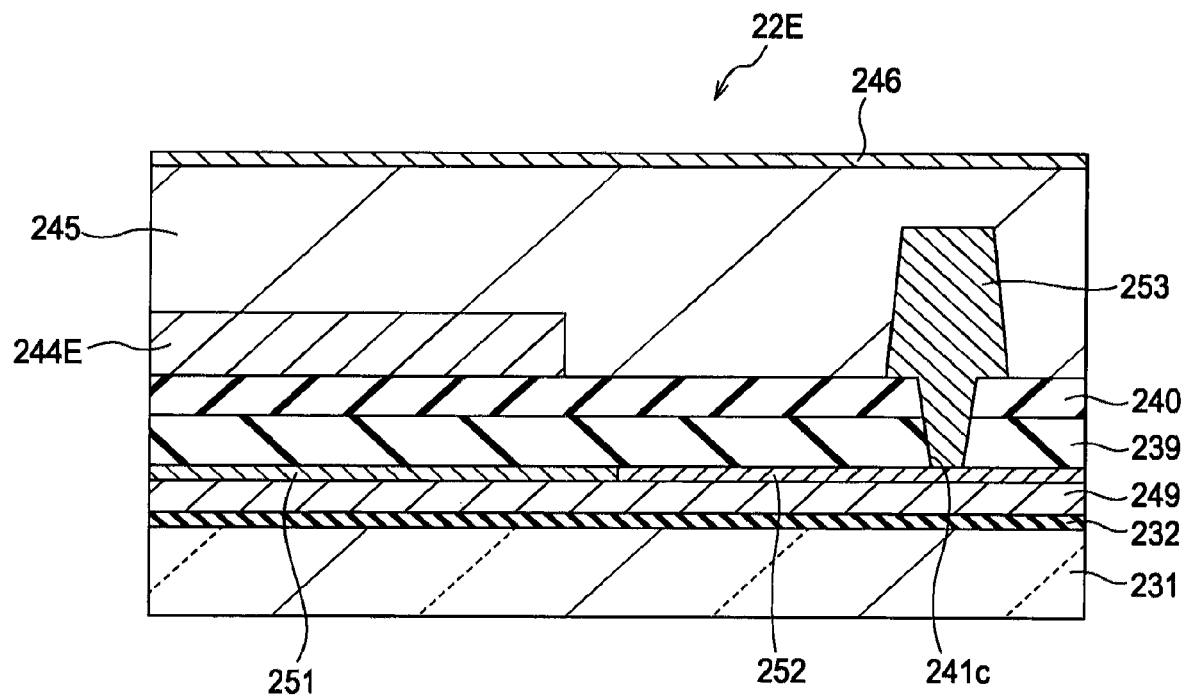
FIG. 21 is a cross-sectional view of a pixel section according to a sixth embodiment of the present invention.
Figure 22:
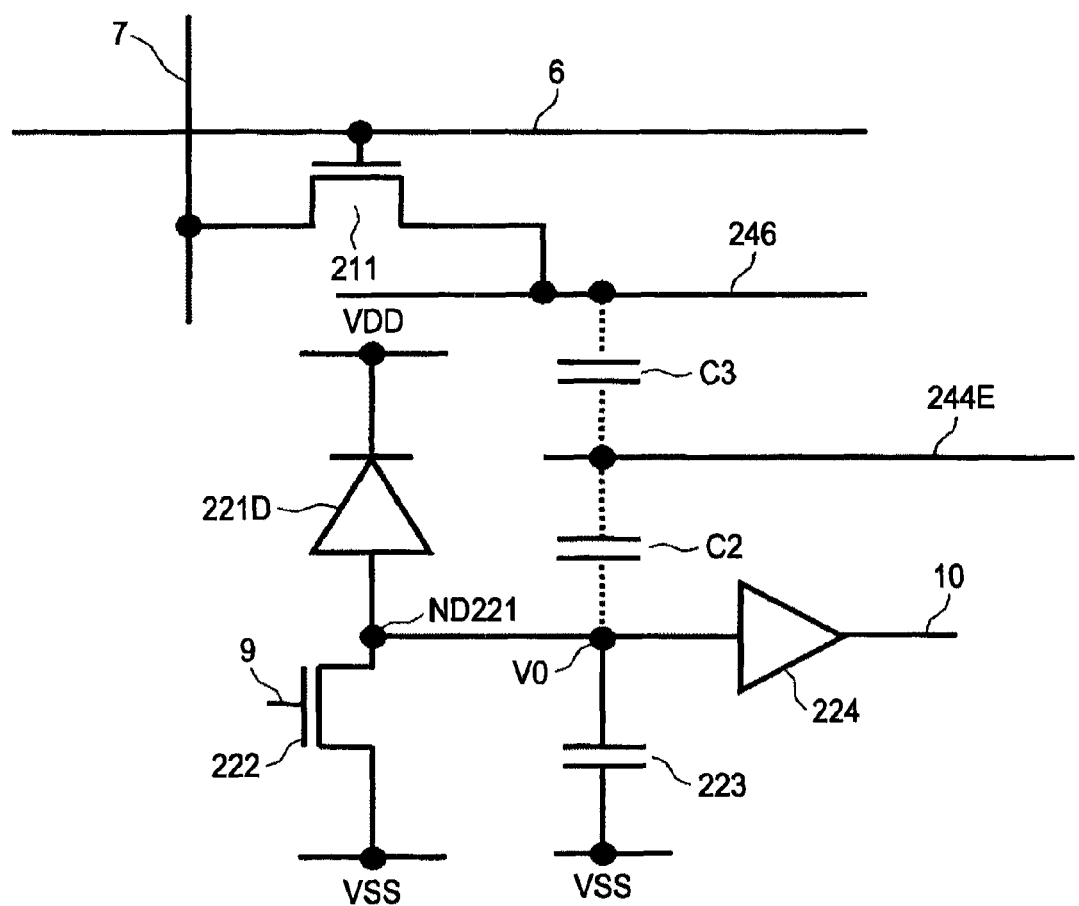
FIG. 22 is a conceptual diagram of an equivalent circuit of a light-receiving cell included in a pixel section according to the sixth embodiment.

FIG. 21 is a cross-sectional view of a pixel section according to the sixth embodiment of the present invention. FIG. 22 is a conceptual diagram of an equivalent circuit of a light-receiving cell included in a pixel section according to the sixth embodiment.

In a pixel section 20E according to the sixth embodiment, a diode 221D formed on a transparent insulating substrate is used as a light-receiving element. This is different from the pixel section 20D according to the fifth embodiment.

In this case, the gate insulating film 232 and the insulating film 249 are formed on the transparent insulating substrate 231. Subsequently, on the insulating film 249, a p-type polycrystalline silicon layer 251 and an n-type polycrystalline silicon layer 252 are connected in parallel so that a p-n junction is established. The interlayer insulating films 239 and 240 are formed on the p-type polycrystalline silicon layer 251 and the n-type polycrystalline silicon layer 252. In a region on the interlayer insulating film 240 which corresponds to the p-type polycrystalline silicon layer 251 (a region capable of being shielded), a shielding conductive film 244E is formed. Furthermore, the contact hole 241c reaching the n-type polycrystalline silicon layer 252 is formed in the interlayer insulating films 239 and 240. The n-type polycrystalline silicon layer 252 forms an anode electrode of the diode 221D. Consequently, the n-type polycrystalline silicon layer 252 is connected to an electrode 253. The planarizing film 245 overlies the shielding conductive film 244E, the interlayer insulating film 240, and the electrode 253. The transparent electrode on the display side 246 is formed on the planarizing film 245.

If a diode is used as a light-receiving element like the sixth embodiment, it is generally required to apply a reverse bias to the diode. Accordingly, a positive voltage is applied to the n-type polycrystalline silicon layer 252. However, if a photoelectron can be detected, a positive voltage may be applied to the p-type polycrystalline silicon layer 251. Furthermore, when a diode is used as a light-receiving element, an active layer in which photoelectric conversion mainly occurs exits near a p-n junction point. Accordingly, as illustrated in FIG. 21, it is desirable that the shielding region formed by the shielding conductive film 244E should not include a region near the p-n junction point. In an example illustrated in FIG. 21, a pn diode is used. However, a pin diode may be used instead of the pn diode. In this case, an active layer is a region i. Accordingly, it is desirable that the shielding region formed by the shielding conductive film should not include a region near the region i.

In this embodiment, a bottom-gate TFT is used. However, a top-gate TFT may be used as a light-receiving element.

Figure 23:
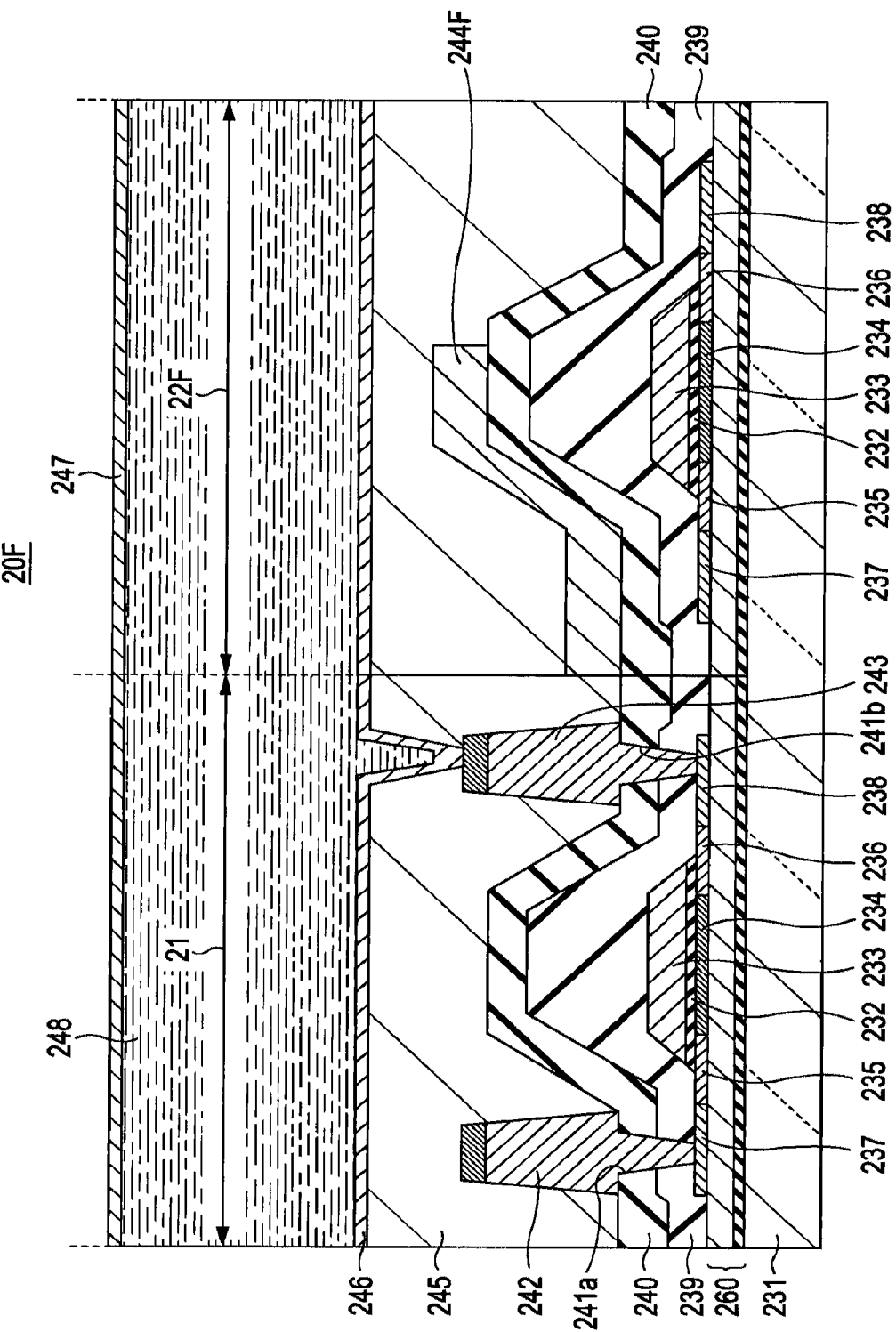
FIG. 23 is a cross-sectional view of a pixel section in which a top-gate TFT according to the sixth embodiment is used.

FIG. 23 is a cross-sectional view of a pixel section in which a top-gate TFT according to this embodiment is used. In FIG. 23, the same reference numerals are used for components having the same functions as those of FIG. 4.

As illustrated in FIG. 23, in a pixel section in which a top-gate TFT 21TF is used, an insulating film 260 is formed on the transparent insulating substrate 231 (for example, a glass substrate). On the insulating film 260, the semiconductor film (channel forming region) 234, a pair of n–diffusion layers (LDD regions) 235 and 236 between which the semiconductor film 234 is sandwiched, and a pair of the n+diffusion layer (source region) 237 and the n+diffusion layer (drain region) 238 between which the semiconductor film 234 is sandwiched are formed. Furthermore, the gate insulating film 232 is formed on the semiconductor film (channel forming region) 234 and a pair of n–diffusion layers (LDD regions) 235 and 236. On the gate insulating film 232, the gate electrode 233 is formed. The interlayer insulating film 239 overlies the gate electrode 233, a part of the n–diffusion layers (LDD regions) 235 and 236, the n+diffusion layer (source region) 237, the n+diffusion layer (drain region) 238, and the insulating film 260. The interlayer insulating film 240 made of, for example, SiN or SiO2 overlies the interlayer insulating film 239. In the case of the pixel section 20 illustrated in FIG. 4, both of the display cell 21 and the light-receiving cell 22 have the above-described configuration.

In the display cell 21, the n+diffusion layer 237 is connected to the source electrode 242 via the contact hole 241a formed in the interlayer insulating films 239 and 240. The n+diffusion layer 238 is connected to the drain electrode 243 via the contact hole 241b formed in the interlayer insulating films 239 and 240. The source electrode 242 and the drain electrode 243 are obtained by performing patterning using aluminum (Al). The source electrode 242 is connected to the signal line 7. The drain electrode 243 is connected to the transparent electrode (pixel electrode) on the display side via the connection electrode. In a light-receiving cell 22F, a shielding conductive film 244F connected to a fixed potential is selectively formed on the interlayer insulating film 240. A shielding region formed by the shielding conductive film 244F illustrated in FIG. 23 does not include a region near the drain. The shielding conductive film 244F can be made of, for example, Al, TiAl, Mo, polycrystalline silicon, or a transparent electrode (ITO).

In the display cell 21 and the light-receiving cell 22F, the planarizing film 245 overlies the interlayer insulating film 240, the source electrode 242, the drain electrode 243, and the shielding conductive film 244F. The transparent electrode on the display side (ITO) 246 overlies the planarizing film 245. A liquid crystal material is sealed between the pixel electrode on the counter electrode side 247 (a transparent electrode: ITO) and the transparent electrode on the display side 246, whereby the liquid crystal layer 248 is formed.

As illustrated in FIG. 23, even if a light-receiving element is a tog-gate TFT, the effect of the voltage change of a pixel electrode on the display side on the gate of a TFT can be compensated by shielding the TFT from the pixel electrode on the display side using a shielding conductive film that has a fixed potential.

As illustrated in FIG. 2, light-receiving elements each receiving light of R, G, or B are disposed. However, a single light-receiving element may be disposed for a single pixel or a plurality of pixels. In this specification, description about the arrangement of light-receiving elements in a display apparatus is not made. Thus, the display apparatus including light-receiving elements illustrated in FIG. 2 can perform light-receiving processing (image capturing) while preventing the mixing of a signal occurring on the display side with a signal occurring on the image capturing side.

Figure 24:
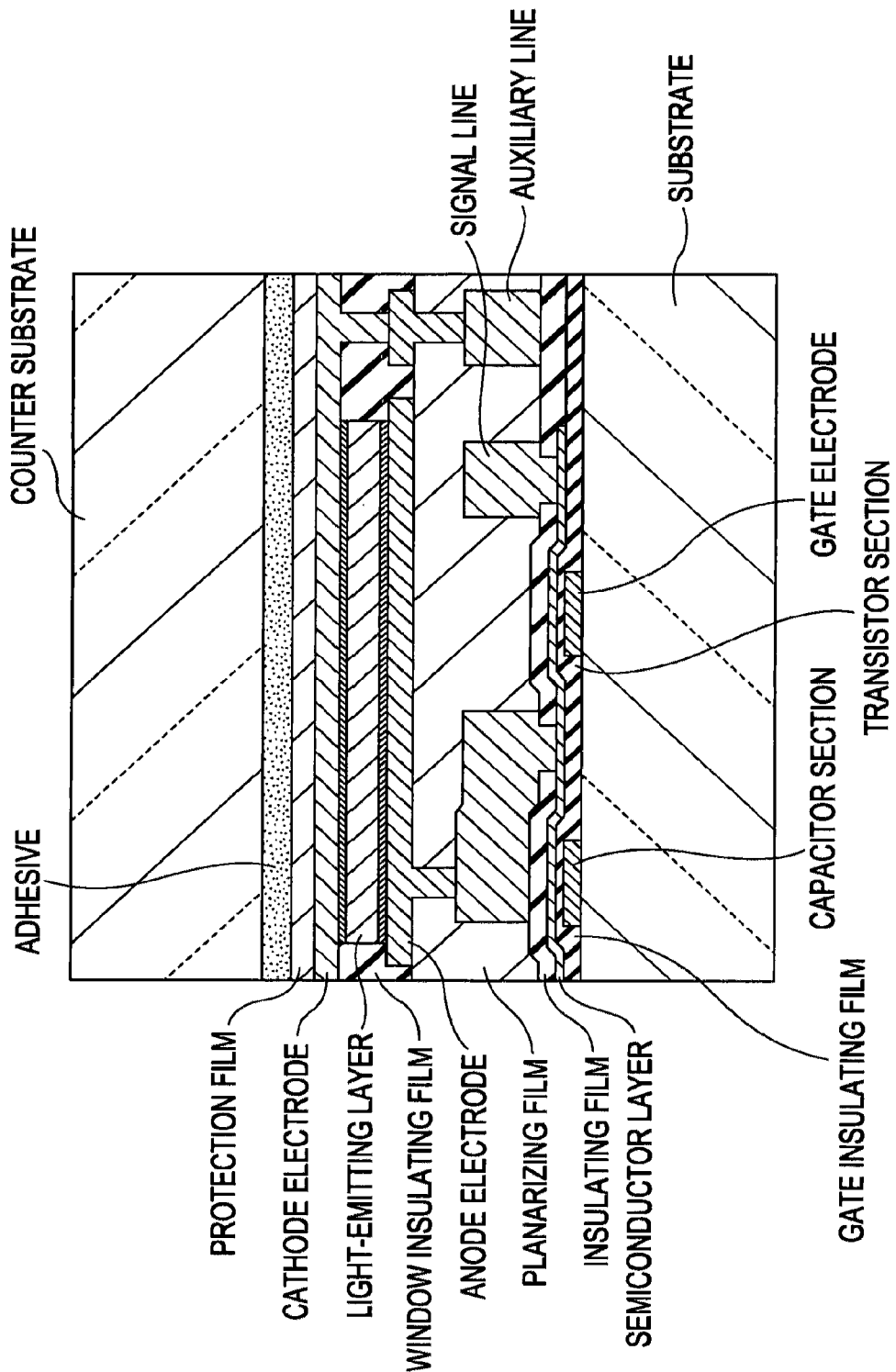
FIG. 24 is a cross-sectional view illustrating a device configuration of a display apparatus according to an embodiment of the present invention.

A display apparatus according to an embodiment of the present invention can be applied to not only a liquid crystal display apparatus but also another display apparatus such as an organic EL display apparatus. For example, a display cell of a display apparatus according to an embodiment of the present invention may be a thin-film device illustrated in FIG. 24. FIG. 24 is a schematic cross-sectional view of a pixel included in a display cell formed on an insulating substrate. As illustrated in FIG. 24, a pixel includes a transistor section including a plurality of thin-film transistors (in this drawing, only a single TFT is illustrated), a capacitor section such as a storage capacitor, and a light-emitting section such as an organic EL element. On the insulating substrate, the transistor section and the capacitor section are formed by performing a TFT process. On the transistor section and the capacitor section, the light-emitting section such as an organic EL element is formed. A transparent counter substrate is attached on the light-emitting section using an adhesive. Thus, a flat panel is created.

Figure 25:
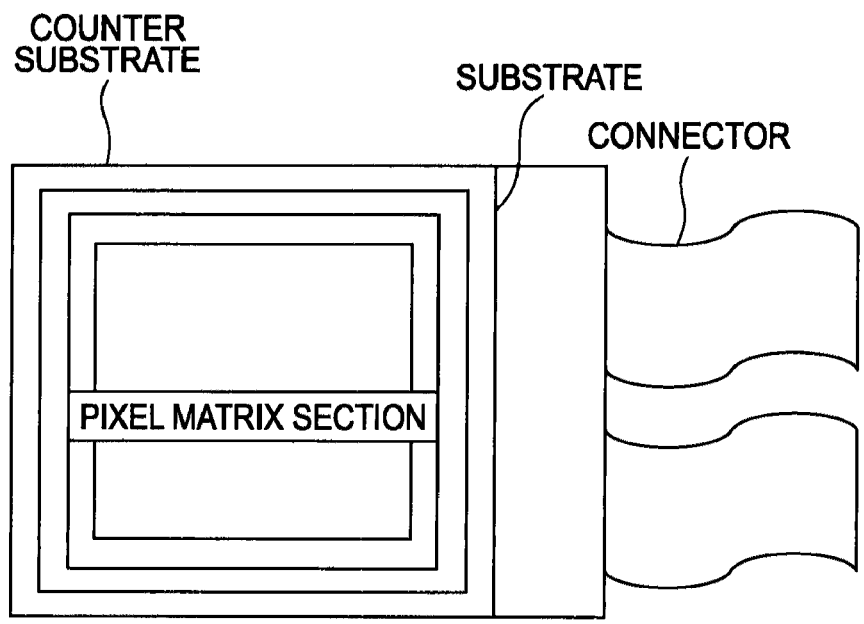
FIG. 25 is a plan view illustrating a module configuration of a display apparatus according to an embodiment of the present invention.

As illustrated in FIG. 25, a display apparatus according to an embodiment of the present invention may be a modular flat display apparatus. For example, on an insulating substrate, a pixel array section in which a plurality of pixels are arranged in a matrix form is formed. Each of the pixels includes one of a liquid crystal layer and an organic EL element, a thin-film transistor, and a thin-film capacitor. An adhesive is applied around this pixel array section (pixel matrix section), and a counter substrate such as a glass substrate is attached to the pixel array section. Thus, a display module is created. A color filter, a protection film, a lightproof film, etc. may be attached to this transparent counter substrate as appropriate. The display module may be provided with an FPC (flexible printed circuit) as a connector for externally transmitting or outputting a signal to or from the pixel array section.

The above-described display apparatus according to an embodiment of the present invention is a flat panel display apparatus, and can be applied to displays of various types of electronic apparatuses such as a digital camera, a notebook-sized personal computer, a mobile telephone, and a video camera for displaying a video signal that has been received thereby or been generated therein as an image or a picture. In the following, an exemplary electronic apparatus employing such a display apparatus will be described.

Figure 26:
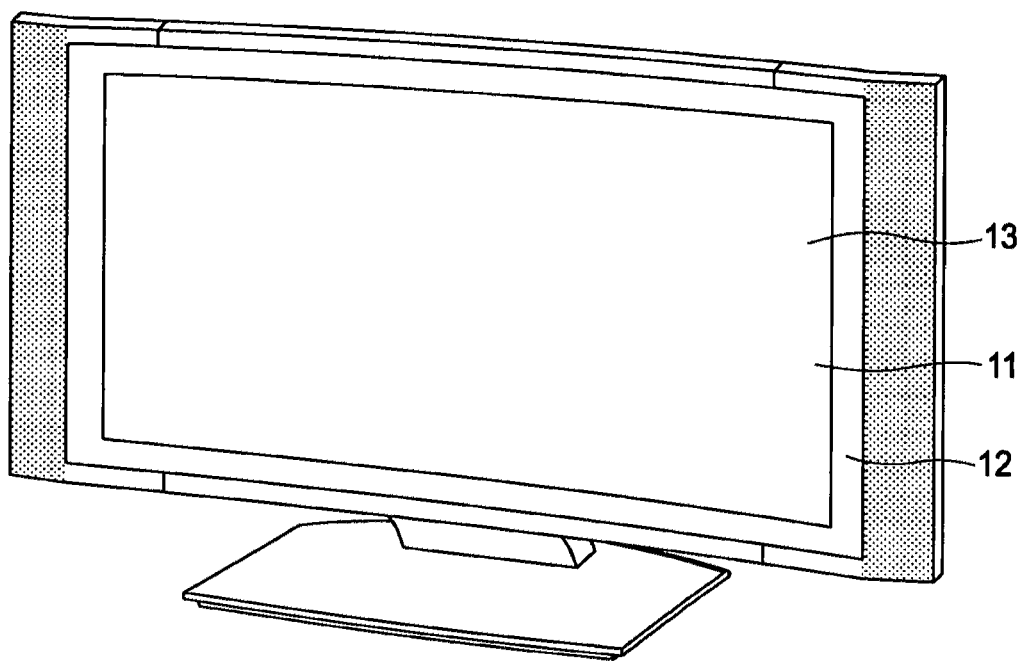
FIG. 26 is a perspective view of a television set including a display apparatus according to an embodiment of the present invention.

FIG. 26 illustrates a television set employing a display apparatus according to an embodiment of the present invention. The television set includes a picture display screen 11 composed of a front panel 12, a filter glass 13. The television set is produced by applying a display apparatus according to an embodiment of the present invention to the picture display screen 11.

Figure 27:
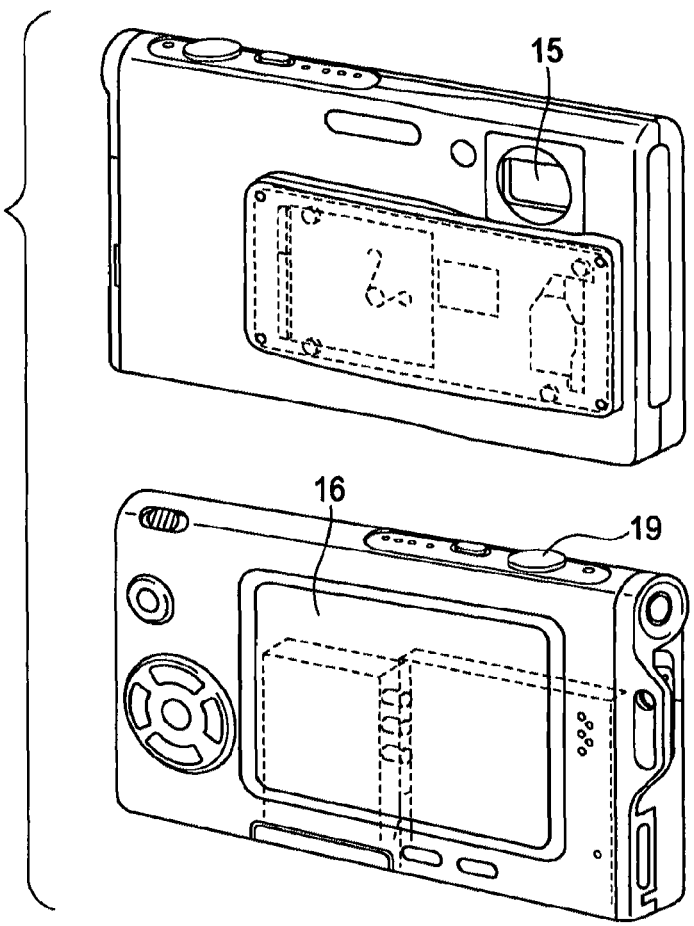
FIG. 27 is a perspective view of a digital still camera including a display apparatus according to an embodiment of the present invention.

FIG. 27 illustrates a digital camera employing a display apparatus according to an embodiment of the present invention. In FIG. 27, the upper diagram is a front view of the digital camera and the lower diagram is a rear view of the digital camera. This digital camera includes a shooting lens, a light-emitting section 15 used for firing of a flash, a display section 16, a control switch, a menu switch, and a shutter 19. This digital camera is produced by applying a display apparatus according to an embodiment of the present invention to the display section 16.

Figure 28:
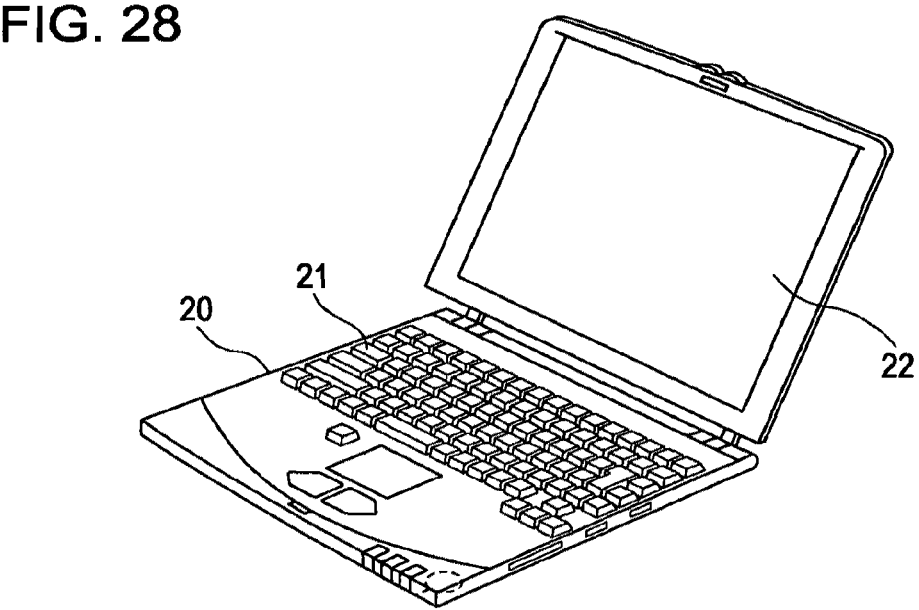
FIG. 28 is a perspective view of a notebook-sized personal computer including a display apparatus according to an embodiment of the present invention.

FIG. 28 illustrates a notebook-sized personal computer employing a display apparatus according to an embodiment of the present invention. A body 20 includes a keyboard 21 used to input a character, and the cover for the body 20 includes a display section 22 used for image display. This notebook-sized personal computer is produced by applying a display apparatus according to an embodiment of the present invention to the display section 22.

Figure 29:
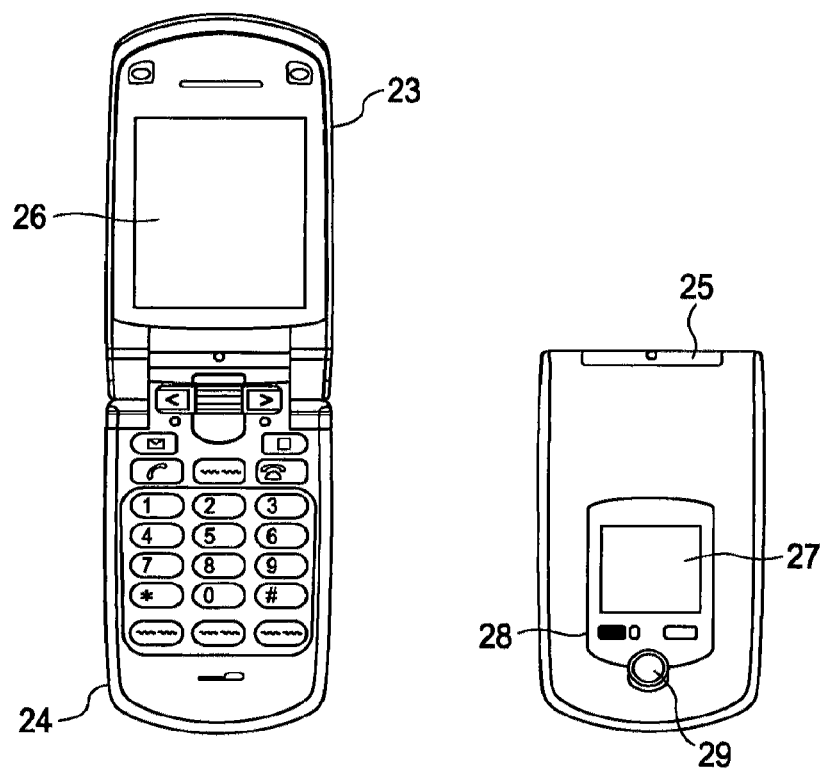
FIG. 29 is a schematic diagram of a mobile terminal device including a display apparatus according to an embodiment of the present invention.

FIG. 29 illustrates a mobile terminal device employing a display apparatus according to an embodiment of the present invention. In FIG. 29, the left diagram illustrates an open state and the right diagram illustrates a closed state. This mobile terminal device includes an upper housing 23, a lower housing 24, a connecting unit (hinge unit) 25, a display 26, a sub-display 27, a picture light 28, and a camera 29. This mobile terminal device is produced by applying a display apparatus according to an embodiment of the present invention to the display 26 or the sub-display 27.

Figure 30:
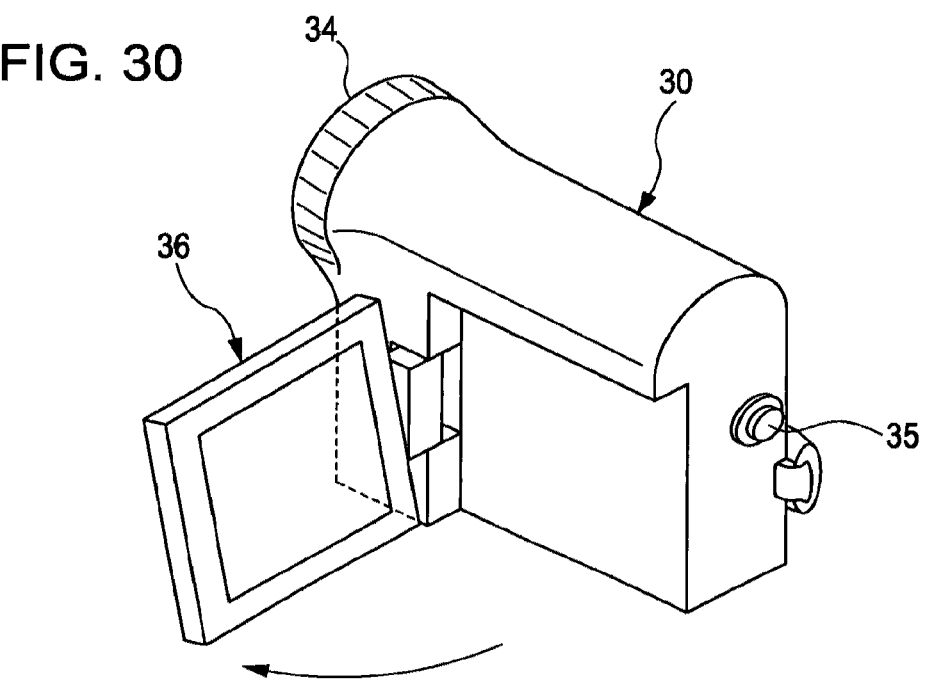
FIG. 30 is a perspective view of a video camera including a display apparatus according to an embodiment of the present invention.

FIG. 30 illustrates a video camera employing a display apparatus according to an embodiment of the present invention. This video camera includes a body 30, a photographing lens 34 disposed on the front side, a photographing start/stop switch 35, and a monitor 36. This video camera is produced by applying a display apparatus according to an embodiment of the present invention to the monitor 36.

It should be understood by those skilled in the art that various modifications, combinations, sub-combinations and alterations may occur depending on design requirements and other factors insofar as they are within the scope of the appended claims or the equivalents thereof.

What is claimed is:
1. A display apparatus comprising:
at least one pixel section including a display cell that has a pixel electrode and a light-receiving cell that has a light-receiving element;
a shielding electric conductor configured to electrically shield the light-receiving element from the pixel electrode on the side of the display cell, the shielding electric conductor being formed below the light-receiving element and having a fixed potential; and
a second shielding electric conductor configured to electrically shield a light-receiving signal line that is connected to the light-receiving cell and transmits a light-receiving signal generated from light received by the light-receiving element from the pixel electrode on the side of the display cell, the second shielding electric conductor being formed above the light-receiving signal line and having a fixed potential.

2. The display apparatus according to claim 1, wherein the shielding electric conductor is formed using an electroconductive film.

3. The display apparatus according to claim 1, wherein the second shielding electric conductor is formed using an electroconductive film.

4. A display apparatus comprising:
- a plurality of pixel sections arranged in a matrix form each including a display cell and a light-receiving cell, the display cell including a pixel electrode and a thin-film transistor configured to operatively connect the pixel electrode and a signal line in response to a scanning pulse applied to a gate electrode, the light-receiving cell including a light-receiving element and being connected to a light-receiving signal line through which a light-receiving signal generated from light received by the light-receiving element is transmitted; and
- a shielding electric conductor configured to electrically shield the light-receiving element and/or the light-receiving signal line from the pixel electrode on the side of the display cell, the shielding electric conductor being formed below the light-receiving element and the light-receiving signal line and having a fixed potential;
- a second shielding electric conductor configured to electrically shield the light-receiving signal line that is connected to the light-receiving cell and transmits a light-receiving signal generated from light received by the light-receiving element from the pixel electrode on the side of the display cell, the second shielding electric conductor being formed above the light-receiving element and the light-receiving signal line and having a fixed potential.

* * * * *